(12) United States Patent
Nakata et al.

(10) Patent No.: US 6,749,959 B2
(45) Date of Patent: Jun. 15, 2004

(54) FUEL CELL GAS SEPARATOR, MANUFACTURING METHOD THEREOF, AND FUEL CELL

(75) Inventors: Hiromichi Nakata, Toyota (JP); Masayoshi Yokoi, Okazaki (JP); Masazumi Onishi, Toyota (JP); Hideo Aihara, Toyota (JP); Masashi Murate, Nagoya (JP); Yoshifumi Kaji, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 263 days.

(21) Appl. No.: 09/802,959

(22) Filed: Mar. 12, 2001

(65) Prior Publication Data

US 2001/0028974 A1 Oct. 11, 2001

(30) Foreign Application Priority Data

Mar. 13, 2000 (JP) ........................ 2000-068553
Jun. 7, 2000 (JP) ........................ 2000-169897
Mar. 2, 2001 (JP) ........................ 2001-058173

(51) Int. Cl.$^7$ ........................ H01M 2/14; H01M 2/16
(52) U.S. Cl. ........................ 429/34; 429/38; 429/39; 427/115
(58) Field of Search ........................ 429/34, 38, 39; 427/115

(56) References Cited

U.S. PATENT DOCUMENTS

| | | | | |
|---|---|---|---|---|
| 5,624,769 A | * | 4/1997 | Li et al. | 439/32 |
| 5,631,099 A | * | 5/1997 | Hockaday | 429/30 |
| 5,798,188 A | * | 8/1998 | Mukohyama et al. | 429/34 |
| 6,090,228 A | * | 7/2000 | Hwang et al. | 148/518 |
| 6,280,868 B1 | * | 8/2001 | Badwal et al. | 439/34 |
| 6,291,094 B1 | * | 9/2001 | Yoshimura et al. | 429/34 |
| 6,372,376 B1 | * | 4/2002 | Fronk et al. | 429/41 |

FOREIGN PATENT DOCUMENTS

| | | | | |
|---|---|---|---|---|
| JP | 60 115173 | | 6/1985 | |
| JP | 60-1153173 | | 6/1985 | |
| JP | 05-1826679 | | 7/1993 | |
| JP | 2000-036309 | * | 2/2000 | |
| JP | 2000036309 A | * | 2/2000 | H01M/8/02 |
| JP | 2000100452 A | * | 4/2000 | H01M/8/02 |

OTHER PUBLICATIONS

Hawley's Condensed Chemical Dictionary, 11$^{th}$ edition, p. 835, 1987 (no month).*

* cited by examiner

Primary Examiner—Patrick Ryan
Assistant Examiner—Tracy Dove
(74) Attorney, Agent, or Firm—Kenyon & Kenyon

(57) ABSTRACT

The gas separator is provided with a substrate portion having a predetermined concave-convex shape, an underlying coating layer formed on the substrate portion, a first coating layer for coating the substrate portion and the underlying coating layer, and a second coating layer formed thereon. The second coating layer is formed from a carbon material, and is sufficiently conductive. Moreover, the second coating layer protects the underlying layer. The first coating layer is formed from a noble metal. Therefore, the first coating layer coated with the second coating layer exhibits extremely high corrosion resistance. The underlying coating layer and the substrate portion are coated with the first and second coating layers, so that the progress in corrosion can be sufficiently prevented. Thus, excellent overall corrosion resistance of the separator can be realized.

20 Claims, 23 Drawing Sheets

FIG. 7A
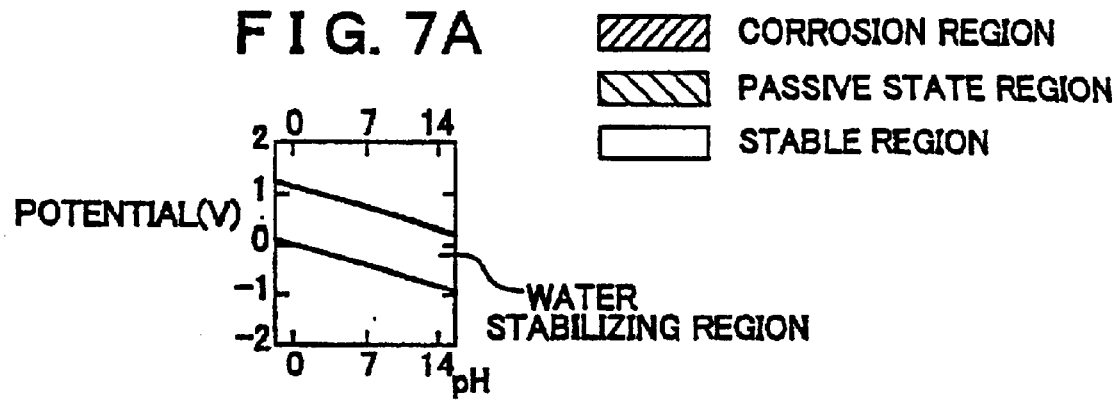
FIG. 7B  FIG. 7C  FIG. 7D
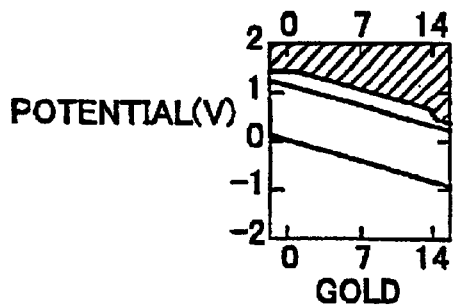 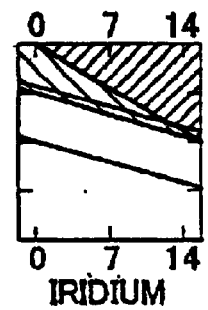 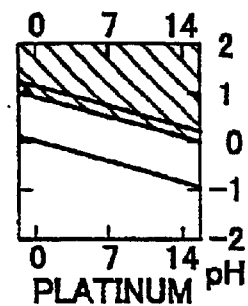
GOLD　　　IRIDIUM　　PLATINUM
FIG. 7E  FIG. 7F  FIG. 7G
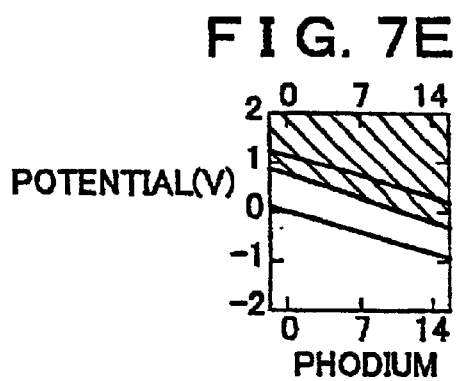 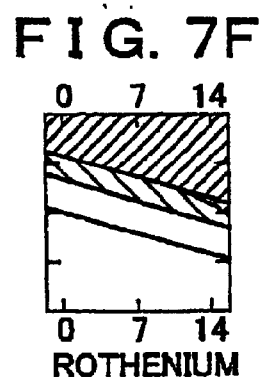 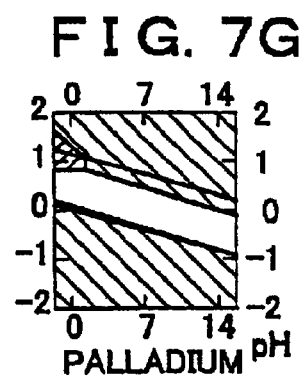
PHODIUM　ROTHENIUM　PALLADIUM
FIG. 7H  FIG. 7I  FIG. 7J
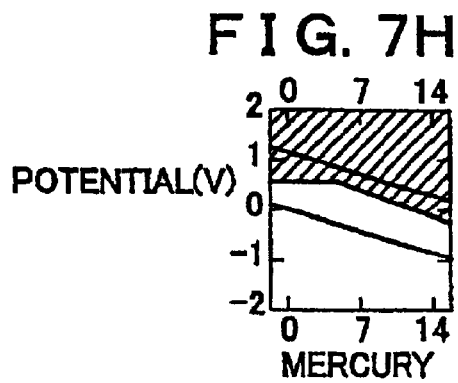 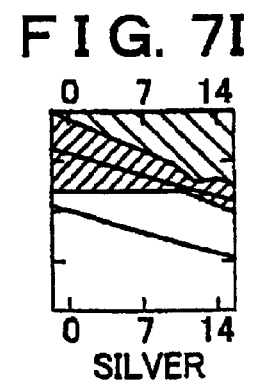 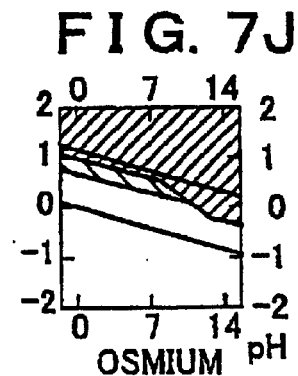
MERCURY　　SILVER　　OSMIUM

FIG. 8A  FIG. 8B  FIG. 8C
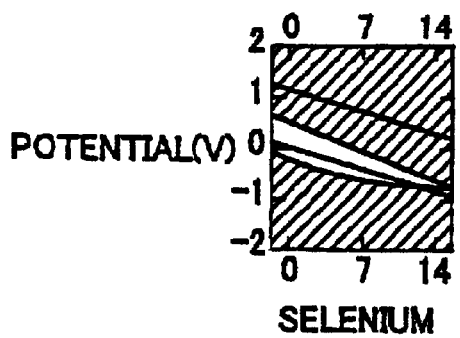
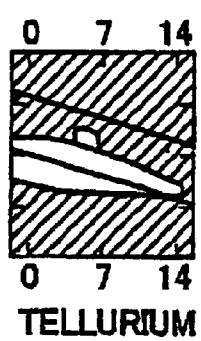
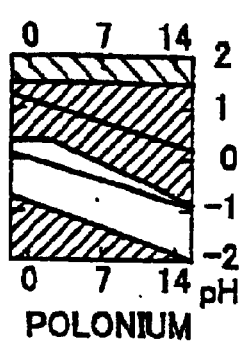
SELENIUM  TELLURIUM  POLONIUM
FIG. 8D  FIG. 8E  FIG. 8F
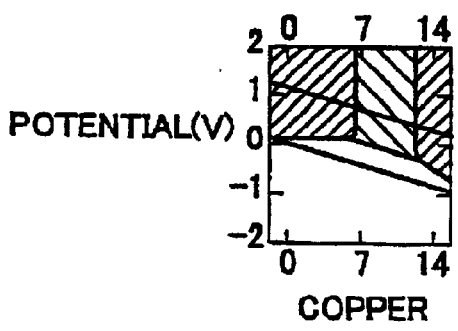
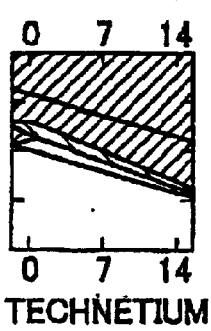
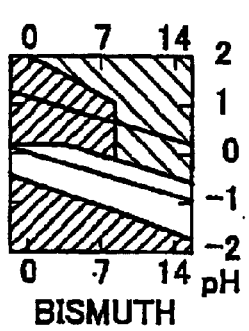
COPPER  TECHNETIUM  BISMUTH
FIG. 8G  FIG. 8H  FIG. 8I
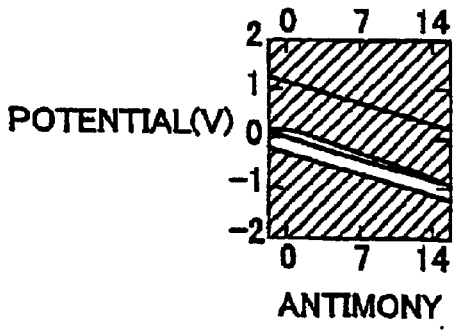
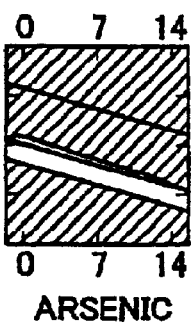
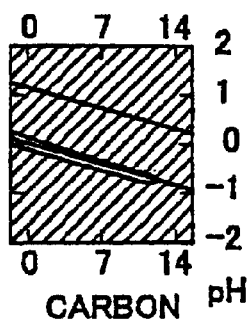
ANTIMONY  ARSENIC  CARBON
FIG. 8J  FIG. 8K  FIG. 8L
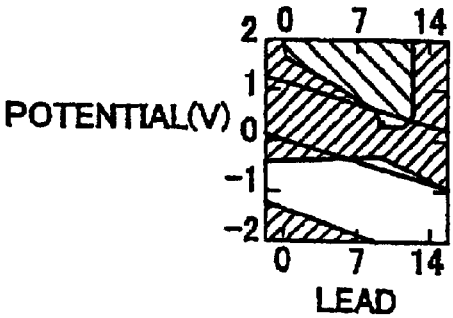
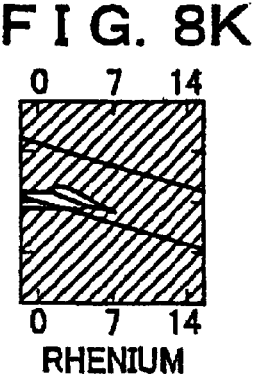
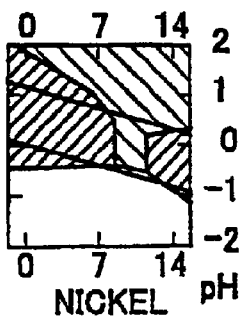
LEAD  RHENIUM  NICKEL

COBALT

THALLIUM

CADMIUM

IRON

TIN

MOLYBDENUM

TUNGSTEN

GERMANIUM

INDIUM

GALLIUM

ZINC

TANTALUM
NIOBIUM

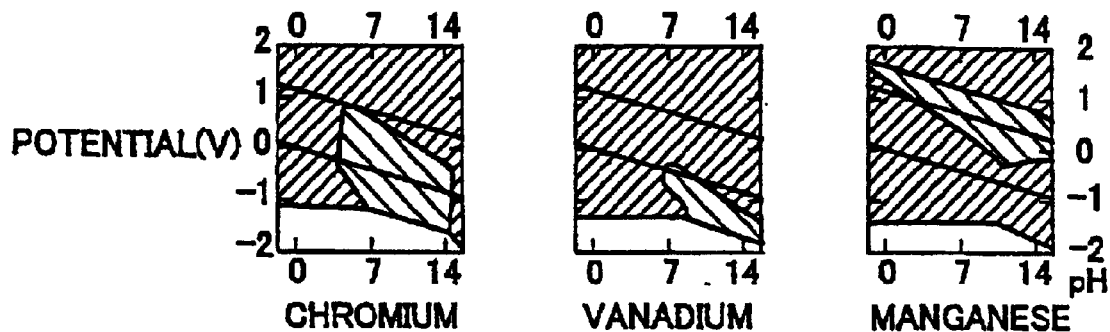
FIG. 10A CHROMIUM
FIG. 10B VANADIUM
FIG. 10C MANGANESE
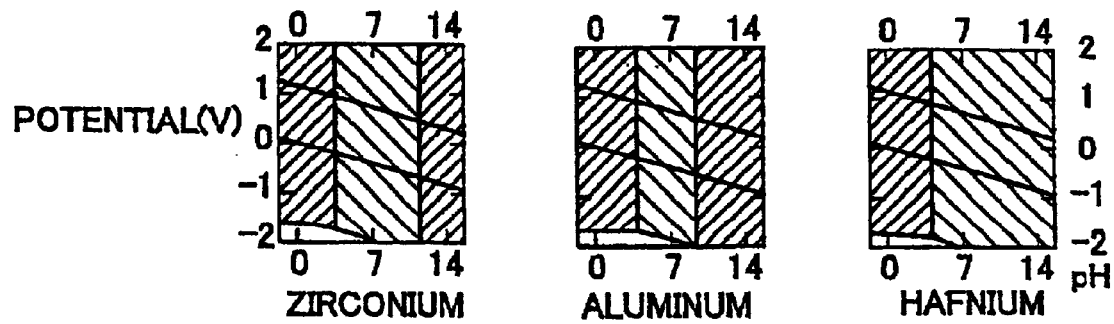
FIG. 10D ZIRCONIUM
FIG. 10E ALUMINUM
FIG. 10F HAFNIUM
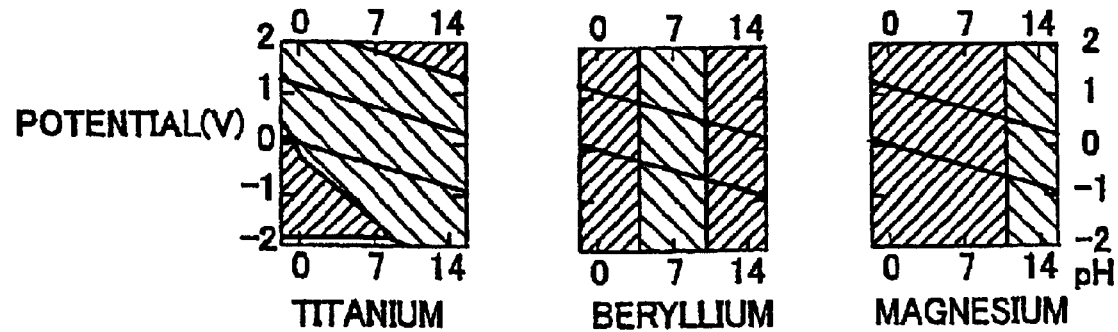
FIG. 10G TITANIUM
FIG. 10H BERYLLIUM
FIG. 10I MAGNESIUM

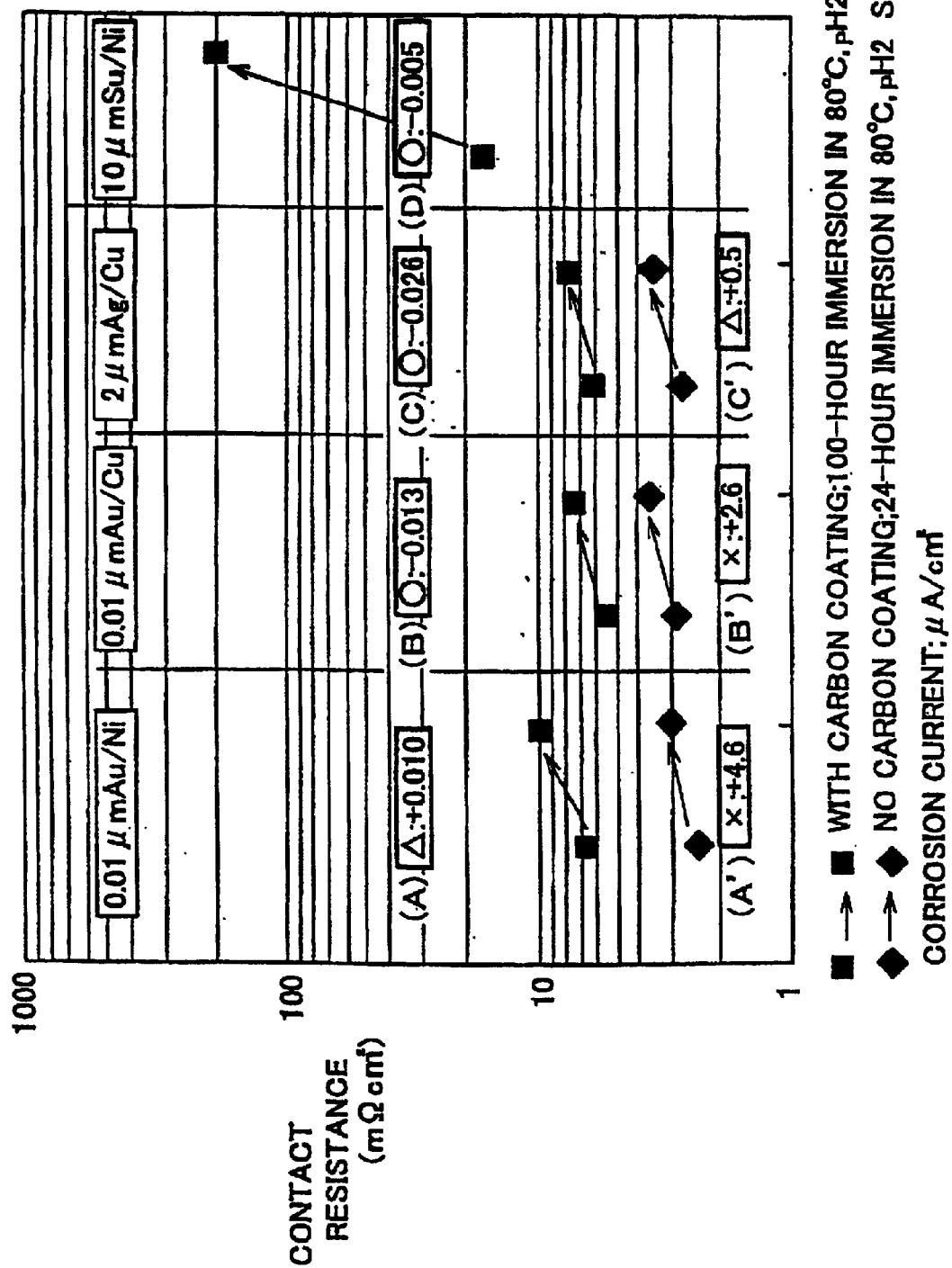

FUEL CELL GAS SEPARATOR, MANUFACTURING METHOD THEREOF, AND FUEL CELL

INCORPORATION BY REFERENCE

The disclosure of Japanese Patent Application Nos. 2000-068553 filed on Mar. 13, 2000 and 2000-169897 filed on Jun. 7, 2000 including the specification, drawings and abstract are incorporated herein by reference in their entirety.

BACKGROUND OF THE INVENTION

1. Field of the Invention

The invention relates to a fuel cell gas separator, a manufacturing method thereof, and a fuel cell. More particularly, the invention relates to a fuel cell gas separator provided between adjacent single cells in a fuel cell having a plurality of single cells stacked on each other, for forming a fuel gas flow path or an oxidized gas flow path together with an adjacent member and for separating the fuel gas and the oxidized gas from each other, a manufacturing method thereof, and the fuel cell.

2. Description of Related Art

A fuel cell gas separator is a member that forms a fuel cell stack having a plurality of single cells stacked on each other. The fuel cell gas separator has sufficient gas non-permeability in order to prevent the fuel gas and oxidized gas supplied to each of adjacent single cells from mixing together. Conventionally, such a fuel cell gas separator has been manufactured by using a carbon material or metal material. In general, a metal material exhibits higher strength, and therefore makes it possible to manufacture a thinner gas separator as compared to the case using the carbon material. Such a reduced thickness of the gas separator enables reduction in overall size of the fuel cell. Moreover, a metal gas separator can be manufactured by a simple method of pressing a metal sheet. As a result, the manufacturing process can be conducted in a quick, simplified manner, resulting in improved productivity. Thus, increase in manufacturing cost can be prevented.

A metal used for manufacturing the metal gas separator can be selected as appropriate from the metals having sufficient conductivity, strength and formability. In particular, by using a metal that is mass distributed as a metal material like stainless steel and aluminum, significant reduction in manufacturing cost can be achieved. The use of such a metal material normally requires the structure for ensuring sufficient corrosion resistance in the operation environment of the fuel cell. As the structure for improving corrosion resistance of the gas separator, the structure of coating the surface of the gas separator with silver has been proposed (e.g., Japanese Patent Laid-Open Publication No. SHO 60-115173). By coating the surface with silver, corrosion resistance of the metal gas separator can be significantly improved.

However, the internal environment of the operating fuel cell becomes highly acidic, thereby possibly making the corrosion resistance of the gas separator insufficient even in the case of the silver-coated metal gas separator. The internal environment of the fuel cell is considered to be acidified mainly by the following two factors: in the fuel cell (e.g., polymer electrolyte fuel cell), a catalyst layer including platinum, a platinum alloy or the like is provided on the surface of the electrolyte membrane. This catalyst layer normally contains a residual sulfate or the like of platinum that is used as a material for forming the catalyst layer. Accordingly, when the fuel cell is started, the residual platinum salt is eluted into the water produced in the gas flow path in the fuel cell, thereby acidifying the internal environment of the fuel cell. Moreover, the solid polymer electrolyte membrane provided in the polymer electrolyte fuel cell includes sulfonates as a functional group for realizing the proton conductivity. This solid polymer electrolyte membrane is gradually decomposed little by little at the portions of the sulfonates during power-generating operation of the fuel cell, thereby producing sulfuric acid. Thus, the internal environment of the fuel cell is acidified.

It is known that such platinum-salt elution and sulfonate decomposition as described above acidify the internal environment of the fuel cell to about pH 2. Under such strongly acidic conditions, the corrosion resistance of the gas separator may possibly become insufficient over the long-time operation of the fuel cell, even if the gas separator is coated with silver having a low ionization tendency. As the surface of the gas separator corrodes, the metal forming the gas separator is eluted as metal ions. Thus, if the metal ions (silver ions, or ions of a metal forming the substrate portion of the silver-coated separator) are eluted from the gas separator into the solid polymer electrolyte membrane even in a slight amount, such metal ions are attracted to the ion exchange groups (sulfonates) included in the electrolyte membrane, thereby degrading the proton conductivity of the solid polymer electrolyte membrane. This is not desirable for maintaining the performance of the fuel cell. Accordingly, a fuel cell gas separator with improved corrosion resistance has been desired.

SUMMARY OF THE INVENTION

The invention is made in view of the foregoing problems, and it is an object of the invention to provide a fuel cell gas separator for realizing sufficient corrosion resistance in a metal gas separator, a manufacturing method thereof, and a fuel cell.

In order to achieve the aforementioned object, a fuel cell gas separator according to one aspect of the invention includes a separator base material formed from a metal, a noble metal coating layer formed at least on a part of the separator base material, and a carbon coating layer formed on the noble metal coating layer. The noble metal coating layer is formed at least on the separator base material surface in a region of the gas separator that contacts an adjacent member of the fuel cell when the gas separator is integrated into the fuel cell, in other words, a region associated with a contact resistance corresponding to a contact surface that is in contact with the adjacent member.

A method for manufacturing a fuel cell gas separator according to another aspect of the invention includes the steps of (a) forming a separator base material having a predetermined shape from a metal, (b) forming a noble metal coating layer from a noble metal at least on a part of the separator base material formed in the step (b), i.e., at least on a region associated with a contact resistance with an adjacent member on a separator base material surface corresponding to a contact surface that is in contact with the adjacent member when the gas separator is integrated into the fuel cell, and (c) forming a carbon coating layer from a carbon material on the noble metal coating layer formed in the step (b).

A method for manufacturing a fuel cell gas separator according to still another aspect of the invention includes the steps of (a) forming a noble metal coating layer from a noble metal at least on a region of a surface of a metal member serving as a base material of the gas separator, (b) forming a carbon coating layer from a carbon material on the noble metal coating layer formed in the step (a), and (c) forming the metal member having both the noble metal coating layer and the carbon coating layer being formed on the surface thereof into a predetermined shape.

The fuel cell gas separator according to the aforementioned aspect of the invention as well as the fuel cell gas separators manufactured by the respective manufacturing methods according to the aforementioned aspects of the invention includes a noble metal coating layer formed from a noble metal. This noble metal coating layer is formed at least on a region associated with a contact resistance with an adjacent member on a separator base material surface corresponding to a contact surface that is in contact with the adjacent member when the gas separator is integrated into the fuel cell. Accordingly, in the metal forming such a separator, the region coated with the noble metal coating layer, i.e., the region associated with the conductivity of the fuel cell gas separator, is not oxidized to form a passive state film. As a result, increase in resistance resulting from the passive state film can be prevented.

Moreover, the noble metal forming the noble metal coating layer is a highly corrosion-resistant metal having a low ionization tendency. Therefore, in the fuel cell gas separator, sufficient corrosion resistance can be ensured in the region where such a noble metal coating layer is formed. In particular, the carbon coating layer of the carbon material is further formed on the noble coating layer of the noble metal. Therefore, extremely high corrosion resistance can be realized in the region where the noble metal coating layer is formed. Moreover, by providing the carbon coating layer on the noble metal coating layer, the noble metal coating layer is exposed to a milder environment (pH closer to neutral). Therefore, the required thickness of the noble metal coating layer for realizing sufficient corrosion resistance can be reduced. As a result, the manufacturing cost of the fuel gas separator can be reduced as compared to the case where the corrosion resistance is ensured only with the noble metal.

Note that the carbon coating layer formed from the carbon material need only contain the carbon material in such an amount that is capable of realizing sufficient conductivity. The carbon coating layer may further include a binder or the like for forming the layer as the carbon coating layer.

Moreover, in the fuel cell gas separator according to the aforementioned aspect of the invention and the manufacturing methods according to the aforementioned aspects of the invention, the structure of forming the carbon coating layer on the noble metal coating layer is not limited to the structure of forming the carbon coating layer directly onto the noble metal coating layer. It is also possible to interpose a coating layer between the noble metal coating layer and the carbon coating layer for the purpose of protecting the noble metal coating layer, improving adhesion between the noble metal coating layer and carbon coating layer, or the like. The invention is also applicable to such a structure.

In the fuel cell gas separator according to the aforementioned aspect of the invention, the noble metal coating layer may have a thickness in a range from 0.01 $\mu$m to 10 $\mu$m. Normally, the plating layer is not a uniform, smooth layer, and has small holes therein. Formation of such holes can be suppressed by increasing the plating thickness. However, in the metal plating, the effect of suppressing formation of the small holes normally reaches a saturated state when the thickness exceeds about 10 $\mu$m. Therefore, by providing the noble metal layer having such a thickness, the metal forming the fuel cell gas separator and coated with the noble metal coating layer is prevented from being corroded through the small holes. As a result, corrosion resistance of the fuel cell gas separator can be effectively ensured. In particular, the fuel cell gas separator according to the aforementioned aspect of the invention includes the carbon coating layer formed from the carbon material. Therefore, the degree of corrosion resistance required for the noble metal coating layer is reduced, whereby sufficient corrosion resistance can be obtained even if the thickness of the noble metal coating layer is reduced to 1 $\mu$m or less.

In the fuel cell gas separator of the invention as well as in the first and second manufacturing methods of the invention, the noble metal forming the noble metal coating layer may be silver. Silver is a relatively less noble metal in the noble metals. However, by providing the carbon coating layer thereon, silver itself can realize sufficient corrosion resistance. Moreover, silver is a relatively inexpensive metal in the noble metals. Therefore, the cost required for manufacturing the fuel cell gas separator having excellent corrosion resistance and conductivity can be reduced.

Also, the noble metal forming the noble metal coating layer may be gold. According to a separator having a noble metal coating layer formed from gold, even in a case that an internal environment of the fuel cell is made severer, such as a case that the fuel cell is operated at a higher temperature, the reliability regarding the corrosion resistance can be secured.

Moreover, the separator base material may be formed from a base metal. The carbon coating layer may be formed on a region forming the gas flow path within the fuel cell, in addition to the region where the noble metal coating layer is formed, on the separator base material. The base metal forming the separator base material may form a passive state film under a condition that the carbon coating layer is formed thereon.

With such a structure, the separator base material is formed from a base metal that may form a passive state film under the condition that the carbon coating layer is formed thereon. Therefore, sufficient corrosion resistance can be provided by also coating the region other than the region where the noble metal coating layer is formed. The base metal that forms a passive state film (which is an oxide film) is protected from corrosion by forming the passive state layer. Therefore, such a base metal has excellent corrosion resistance. Moreover, the corrosion resistance of such a base metal is further improved by forming the carbon coating layer of the carbon material thereon. Accordingly, by forming the carbon coating layer also on the region other than the region where the noble metal coating layer is formed, sufficient overall corrosion resistance of the fuel cell gas separator can be ensured. Note that an example of the base metal material having excellent corrosion resistance by forming the passive state film at its surface, and having sufficient strength as well as formability suitable for forming the separator base material is stainless steel.

The noble metal coating layer may further be formed on a region forming the gas flow path, in addition to the region associated with the contact resistance, on the separator base material. With such a structure, corrosion resistance can be ensured by both the noble metal coating layer formed from the noble metal and the carbon coating layer formed thereon, even in the region forming the gas flow path.

The fuel cell gas separator may further include an underlying coating layer formed from a base metal and formed between the noble metal coating layer and the separator base material at least on the region associated with the contact resistance in the separator base material.

Moreover, the base metal forming the underlying coating layer may be nobler, i.e., may have a lower ionization tendency, than the metal forming the separator base material. With such a structure, the noble metal coating layer of the noble metal can easily be formed even when the separator base material is formed from a base metal having a large ionization tendency. More specifically, since the base metal having a large ionization tendency may possibly be corroded by a noble metal plating bath, it is difficult to plate such a base metal with a noble metal. However, the noble metal plating can be facilitated by forming the underlying coating layer of a nobler base metal on the separator base material. In the case where different metal species are present, a less noble metal may be more likely to corrode. However, by providing the underlying coating layer of a nobler base metal, such an effect is suppressed, whereby the overall corrosion resistance of the separator can be ensured.

The carbon coating layer and the underlying coating layer may further be formed on a region forming the gas flow path within the fuel cell, in addition to the region associated with the contact resistance, on the separator base material. The underlying coating layer may be formed from a base metal that may form a passive state film under a condition that the carbon coating layer is formed thereon.

With such a structure, the underlying coating layer is formed from a base metal that may form a passive state film under a condition that the carbon coating layer is formed thereon. Therefore, by providing the underlying coating layer having the carbon coating layer thereon also on the region other than the region where the noble metal coating layer is formed, sufficient corrosion resistance can be obtained. The base metal that forms a passive state film (which is an oxide film) is protected from corrosion by forming the passive state layer. Therefore, such a base metal has excellent corrosion resistance. Moreover, the corrosion resistance is further improved by providing the carbon coating layer thereon. Accordingly, even if the noble metal coating layer is not provided in the region forming the gas flow path within the fuel cell, sufficient overall corrosion resistance of the fuel cell gas separator can be ensured by providing this region with the underlying coating layer having the carbon coating layer formed thereon.

The underlying coating layer may have a thickness in a range from 0.01 $\mu$m to 10 $\mu$m. Normally, the plating layer is not a uniform, smooth layer, and has small holes therein. Formation of such holes can be suppressed by increasing the plating thickness. However, in the metal plating, the effect of suppressing formation of the small holes normally reaches a saturated state when the thickness exceeds about 10 $\mu$m. Therefore, by providing the underlying coating layer having such a thickness, the metal forming the fuel cell gas separator and coated with the underlying coating layer is prevented from being corroded through the small holes. As a result, corrosion resistance of the fuel cell gas separator can be effectively ensured.

In the manufacturing method according to the aforementioned aspect of the invention, the carbon coating layer may further include an acid-resistant resin or rubber as a binder, in addition to the carbon material. With such a structure, the effect of improving the corrosion resistance of the gas separator by providing the carbon coating layer on the fuel cell gas separator can further be enhanced. In other words, the binder as described above has excellent corrosion resistance, and also, can prevent the water from penetrating through the carbon coating layer formed from the carbon material. As a result, the metal forming the fuel cell gas separator can be prevented from being corroded by the water penetrating through the carbon coating layer.

A fuel cell gas separator according to a further aspect of the invention includes a separator base material formed from a metal, a base metal coating layer formed at least on a part of the separator base material, and a carbon coating layer formed on the base metal coating layer. The base metal coating layer is formed from a base metal, and formed at least on a region associated with a contact resistance with an adjacent member on the separator base material surface corresponding to a contact surface that is in contact with the adjacent member when the gas separator is integrated into the fuel cell. The base metal coating layer includes a plurality of electron-conductive particles at least at a surface that is in contact with the carbon coating layer. The electron-conductive particles are stable enough under a condition that the carbon coating layer is formed on the base metal coating layer.

A method for manufacturing a fuel cell gas separator according to a still further aspect of the invention includes the steps of (a) forming a separator base material having a predetermined shape from a metal, (b) forming a base metal coating layer from a base metal at least on a part of the separator base material formed in the step (a), i.e., at least on a region associated with a contact resistance with an adjacent member on a separator base material surface corresponding to a contact surface that is in contact with the adjacent member when the gas separator is integrated into the fuel cell, and (c) forming a carbon coating layer from a carbon material on the base metal coating layer formed in the step (b). The base metal coating layer formed in the step (b) includes a plurality of electron-conductive particles at least at a surface that is in contact with the carbon coating layer. The electron-conductive particles are stable enough under a condition that the carbon coating layer is formed on the base metal coating layer.

A method for manufacturing a fuel cell gas separator according to a yet further aspect of the invention includes the steps of (a) forming a base metal coating layer from a base metal at least on a region of a surface of a metal member serving as a base material of the fuel cell gas separator, (b) forming a carbon coating layer from a carbon material on the base metal coating layer formed in the step (a), and (c) forming the metal member having both the base metal coating layer and the carbon coating layer being formed on the surface thereof into a predetermined shape. The base metal coating layer formed in the step (a) includes a plurality of electron-conductive particles at least at a surface that is in contact with the carbon coating layer, the electron-conductive particles being stable enough under a condition that the carbon coating layer is formed on the base metal coating layer.

The fuel cell gas separator according to the aforementioned aspect of the invention as well as the gas separators manufactured by the respective manufacturing methods according to the aforementioned aspects of the invention include a base metal coating layer formed from a base metal. This base metal coating layer is formed at least on a region associated with a contact resistance with an adjacent member on a separator base material surface corresponding to a contact surface that is in contact with the adjacent member when the gas separator is integrated into the fuel cell. Moreover, this base metal coating layer includes a plurality of electron-conductive particles at least at a surface that is in contact with the carbon coating layer, and the electron-conductive particles are stable enough under a condition that the carbon coating layer is formed on the base metal coating layer. Accordingly, even if the conductivity is reduced in the base metal coating layer due to the fact that the metal forming the base metal coating layer is oxidized to form a passive state film, the conductivity of the separator is ensured by the electron-conductive particles. As a result, increase in resistance of the separator can be prevented.

The electron-conductive particles may be particles containing carbon.

Moreover, the base metal forming the base metal coating layer may be a metal whose surface may be oxidized to form a passive state layer under the condition that the carbon coating layer is formed on the base metal coating layer.

With such a structure, the base metal coating layer is formed from a base metal that forms a passive state film. Therefore, sufficient corrosion resistance can be provided in the region provided with the base metal coating layer. The base metal that forms a passive state film (which is an oxide film) is protected from corrosion by forming the passive state layer. Therefore, such a base metal has excellent corrosion resistance. Moreover, the corrosion resistance is further improved by forming the carbon coating layer on the base metal coating layer. Accordingly, in the region provided with the base metal coating layer, sufficient corrosion resistance in addition to the aforementioned conductivity can be realized.

The aspects of the invention are not limited to such gas separators and manufacturing method thereof as described above. For example, other aspects of the invention are formed as a fuel cell using the gas separator, a gas separator manufactured by the manufacturing method, and a fuel cell using the gas separator. A yet further aspect is formed as a vehicle provided with a fuel cell.

BRIEF DESCRIPTION OF THE DRAWINGS

The foregoing and further objects, features and advantages of the present invention will become apparent from the following description of preferred embodiments with reference to the accompanying drawings, wherein:

FIGS. 7A to 7J are illustrations showing the properties of various metals regarding corrosion;

FIGS. 8A to 8L are illustrations showing the properties of various metals associated with corrosion;

FIGS. 10A to 10I are illustrations showing the properties of various metals associated with corrosion;

FIG. 11 is an illustration showing the examination result regarding the capability of the separators forming from various selected metals;

DETAILED DESCRIPTION OF THE PREFERRED EMBODIMENTS

In order to further clarify the aforementioned structures and functions of the invention, embodiments of the invention will now be described in the following order:

1. Overall structure of the fuel cell;
2. Structure and manufacturing process of a separator of one embodiment, and functions and effects thereof;
3. Description regarding corrosion property of the metals;
4. Experimental evaluation of various materials applied to the separator;
5. Metal species applicable to the separator;
6. Structure, functions and effects of separator 130 of another embodiment; and
7. Another separator manufacturing method.

Figure 1A:
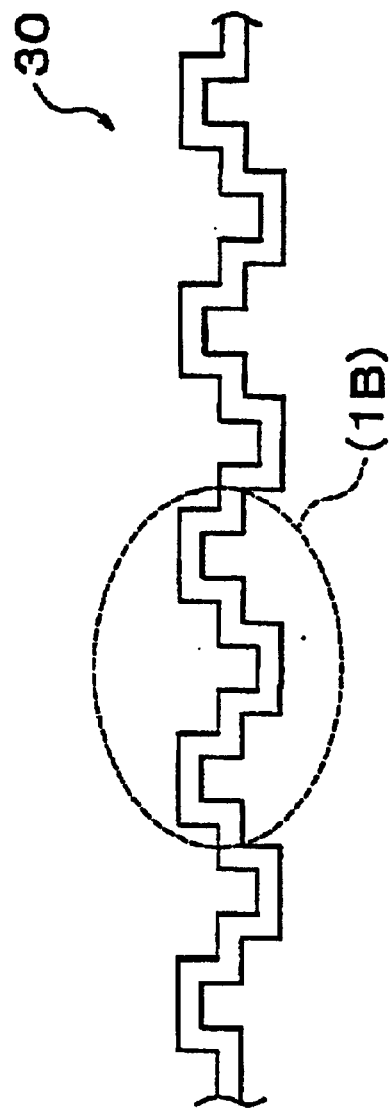
FIGS. 1A and 1B are illustrations showing the structure of a separator according to one preferred embodiment of the invention.
Figure 1B:
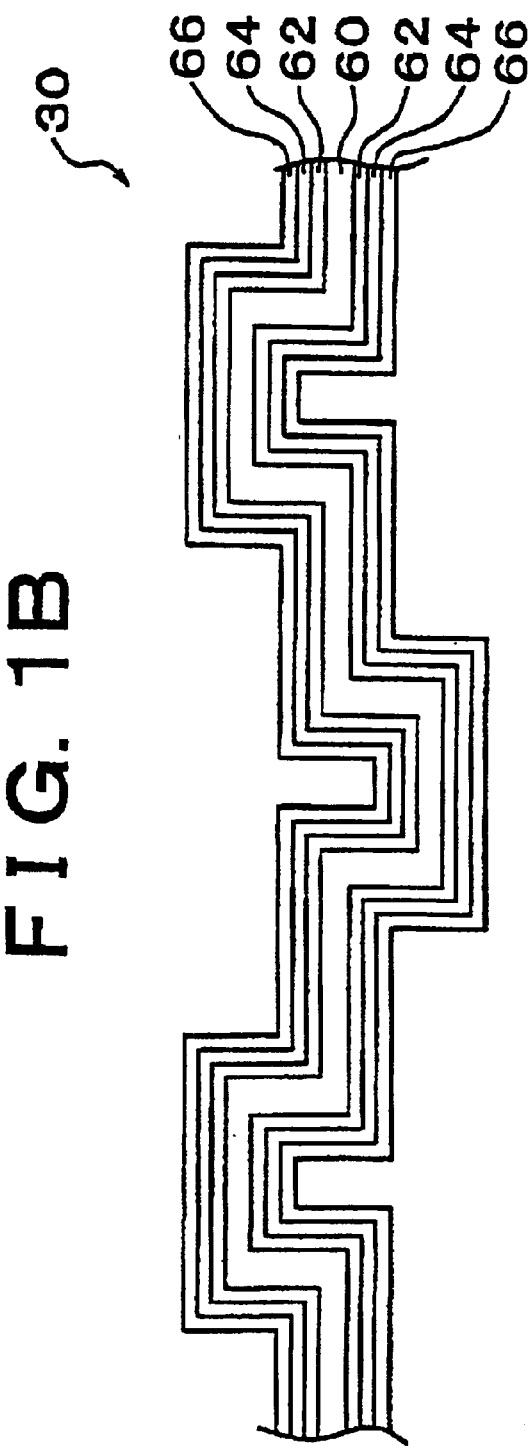

(1) Overall Structure of the Fuel Cell:

FIGS. 1A and 1B are illustrations showing a separator 30 according to one preferred embodiment of the invention. FIG. 1A is a diagram showing the cross-sectional shape of the separator 30. FIG. 1B is a schematic diagram more specifically showing the structure of the region (B) enclosed by the dotted line in FIG. 1A. The separator 30 according to the embodiment of the invention is provided with a substrate portion 60 formed from stainless steel, an underlying coating layer 62 formed from copper as a layer for coating the substrate portion 60, a noble metal coating layer 64 formed from silver as a layer for coating the underlying coating layer 62, and a carbon coating layer 66 formed from a member containing carbon materials as a layer for coating the noble metal layer 64. As described below, the separator 30 has a predetermined concave-convex shape that enables gas flow paths to be formed at the surface thereof. First, the overall structure of the fuel cell formed with the separator 30 will now be described.

Figure 2:
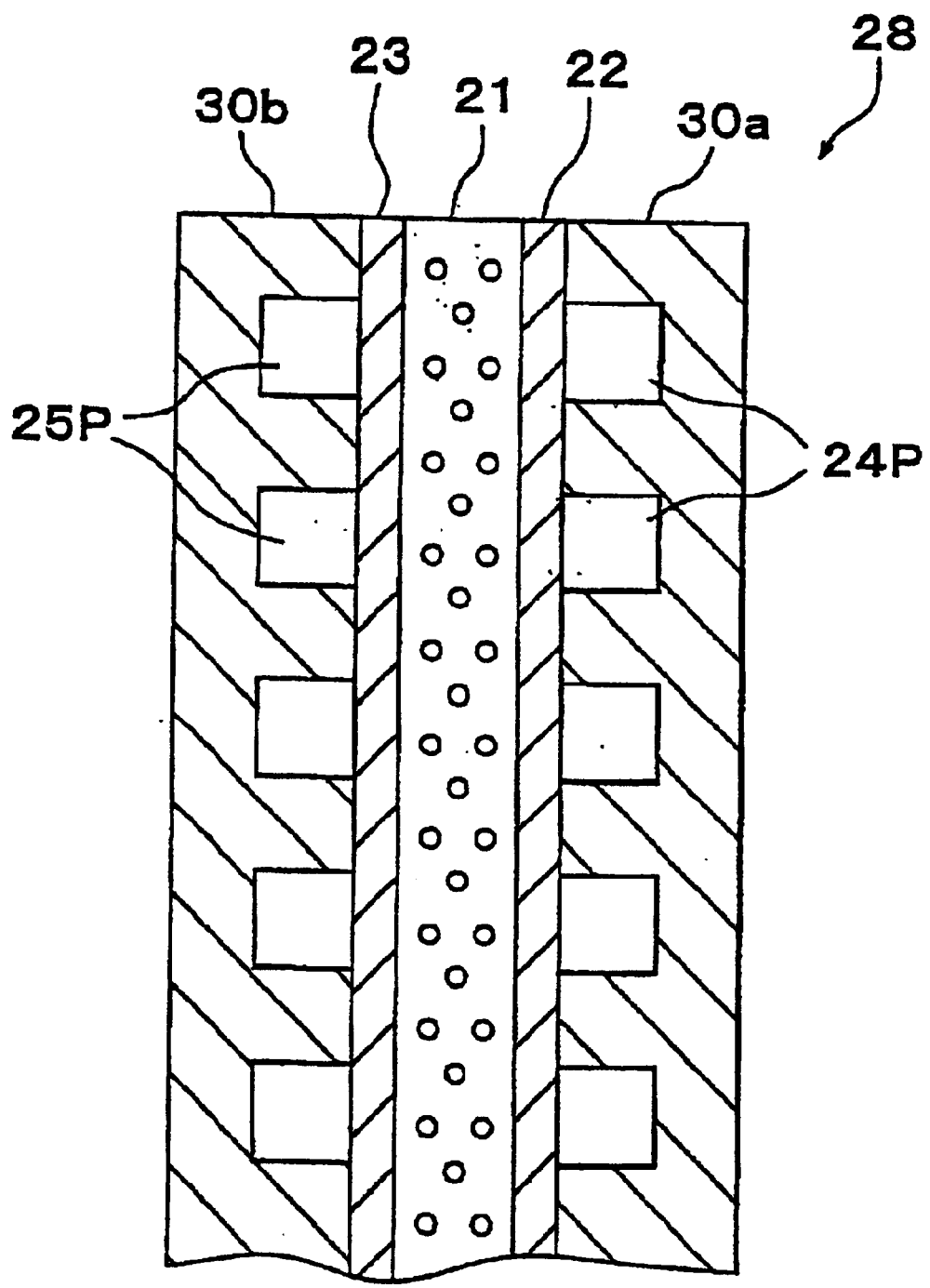
FIG. 2 is a schematic cross-sectional view showing the structure of a single cell.
Figure 3:
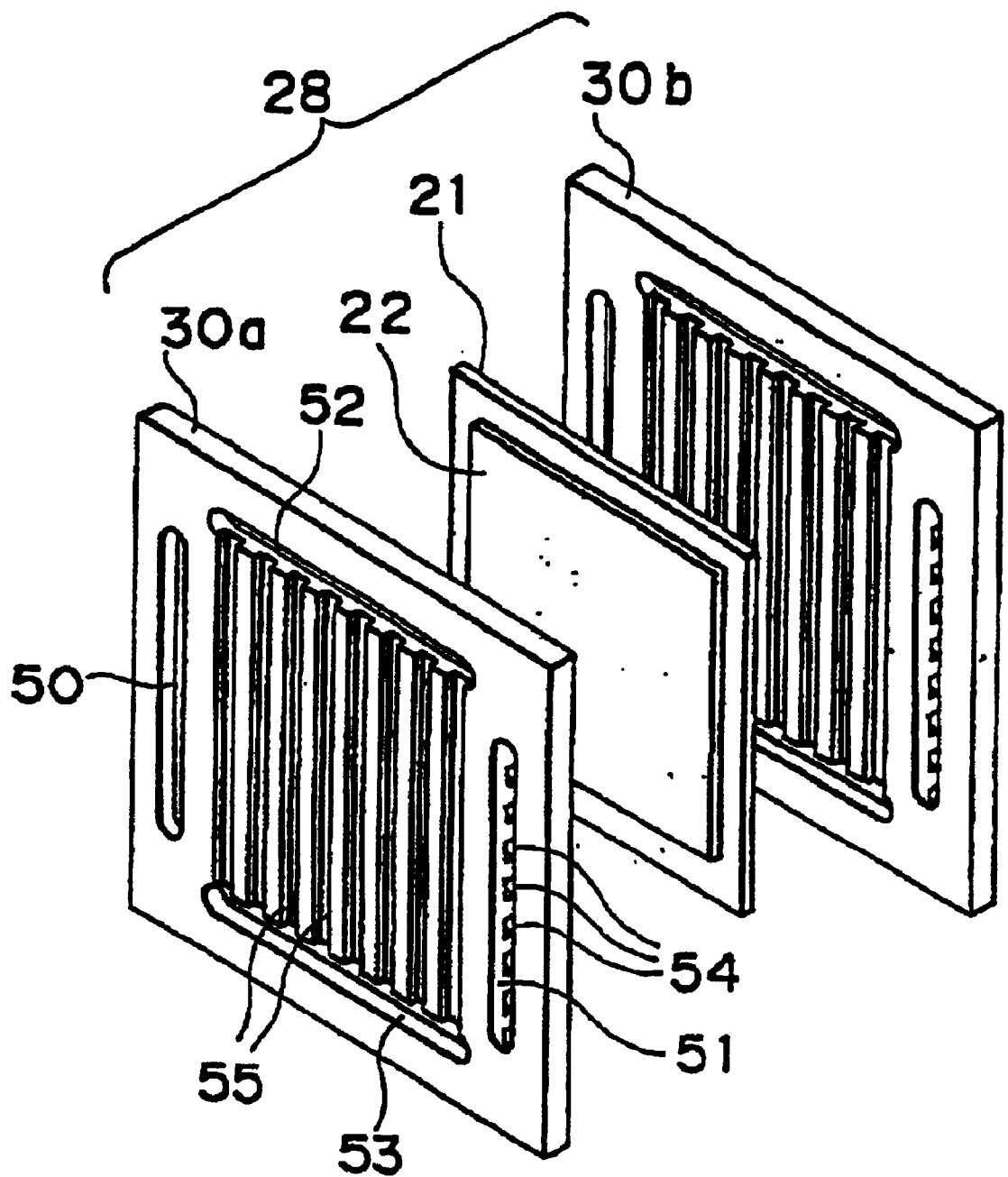
FIG. 3 is an exploded perspective view showing the structure of the single cell.
Figure 4:
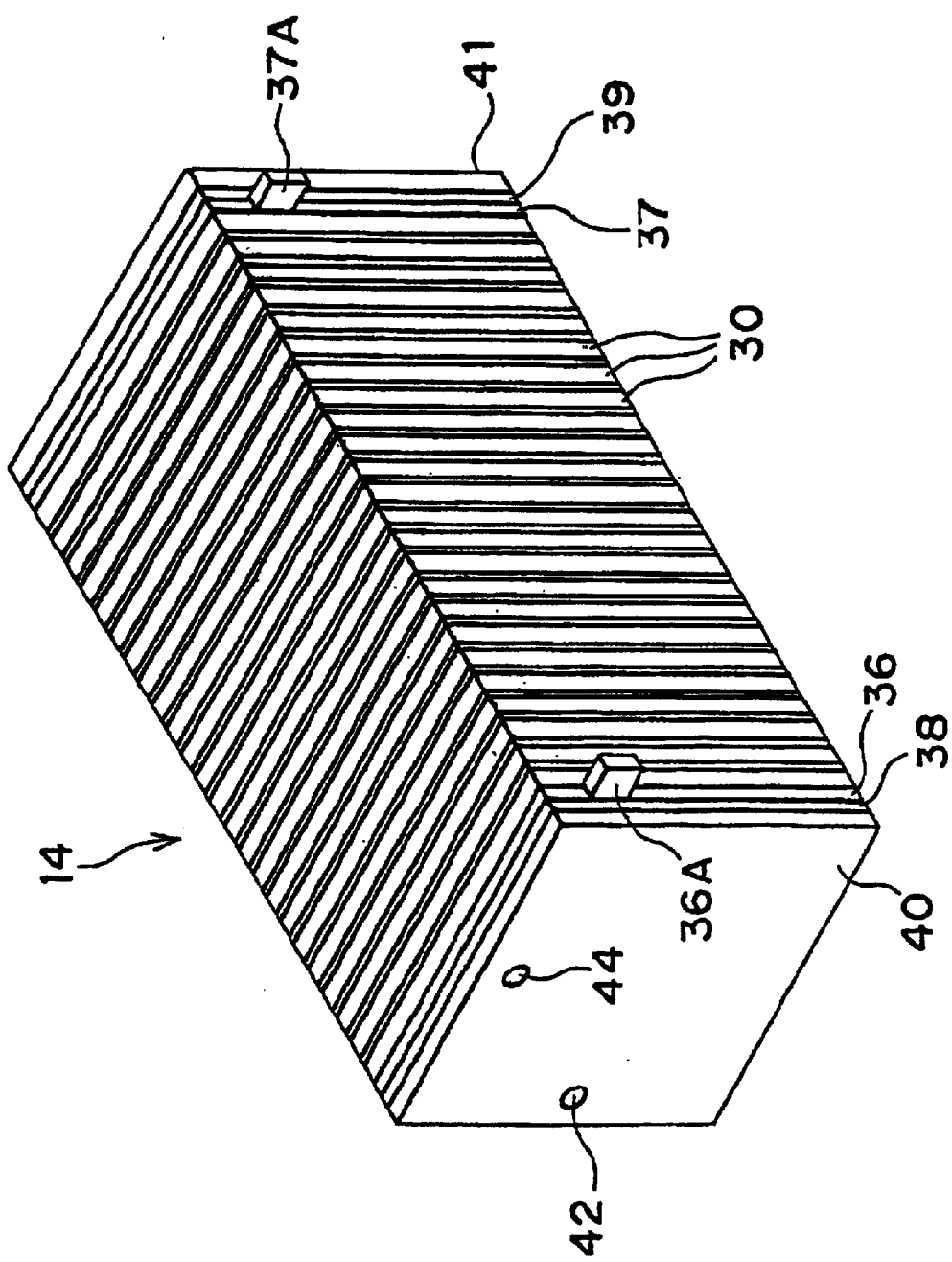
FIG. 4 is a perspective view showing the external appearance of a stacked structure having the single cells stacked on each other.

The fuel cell formed with the separator 30 according to the embodiment of the invention has a stacked structure of a plurality of single cells (constituent units) stacked on each other. FIG. 2 is a schematic cross-sectional view exemplifying the structure of a single cell 28, i.e., a constituent unit of the fuel cell. FIG. 3 is an exploded perspective view showing the structure of the single cell 28. FIG. 4 is a perspective view showing the external appearance of the stacked structure 14 having the single cells 28 stacked on each other.

The fuel cell of this embodiment is a polymer electrolyte fuel cell. The polymer electrolyte fuel cell includes as an electrolyte layer a solid polymer membrane exhibiting excellent conductivity (ionic conductivity) in the wet condition. Such a fuel cell receives hydrogen-containing fuel gas supply at its anode, and also receives oxygen-containing oxidized gas supply at its cathode, thereby causing the electrochemical reaction as given by the following formulas (1), (2) and (3).

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The formula (1) represents a reaction at the anode, formula (2) represents a reaction at the cathode, and the reaction as given by the formula (3) proceeds in the entire fuel cell. Thus, the fuel cell converts the chemical energy of the fuel supplied thereto directly into the electrical energy, and is known as a highly energy-efficient apparatus. As shown in FIG. 2, the single cell 28, i.e., a constituent unit of the fuel cell, is provided with an electrolyte membrane 21, an anode 22, a cathode 23, and separators 30a, 30b.

The anode 22 and cathode 23 are gas diffusion electrodes having the electrolyte membrane 21 interposed therebetween so as to form a sandwich structure. The separators 30a, 30b further interpose the sandwich structure therebetween so as to form the flow paths of the fuel gas and oxidized gas between the respective separators 30a, 30b and the anode 22 and cathode 23. Fuel gas flow paths 24P are formed between the anode 22 and separator 30a, and oxidized gas flow paths 25P are formed between the cathode 23 and separator 30b. The fuel cell is actually assembled with a predetermined number of single cells 28 stacked on each other to form the stacked structure 14.

In FIG. 2, ribs for forming the gas flow paths are shown to be formed at only one surface of each separator 30a, 30b. In the actual fuel cell, however, each separator 30a, 30b has ribs 54, 55 at both surfaces, as shown in FIG. 3. The ribs 54 formed at one surface of each separator 30a, 30b form the fuel gas flow paths 24P together with the adjacent anode 22. The ribs 55 formed at the other surface of each separator 30a, 30b form the oxidized gas flow paths 25P together with the adjacent cathode 23 included in the single cell. Accordingly, the separators 30a, 30b not only serve to form the gas flow paths between the respective separators and the gas diffusion electrodes, but to separate the fuel gas flow from the oxidized gas flow between the adjacent single cells. Thus, in the actually assembled fuel cell, the separators 30a, 30b are not distinguished from each other in terms of their forms or functions. Therefore, the separators 30a, 30b are hereinafter collectively referred to as separator 30.

Note that the ribs 54, 55 formed at the surfaces of each separator need only have such a shape that forms the gas flow paths so as to enable the fuel gas or oxidized gas to be supplied to the gas diffusion electrodes. In this embodiment, a plurality of groove-like structures extending in parallel are formed as the ribs 54, 55 at the surface of each separator. In FIG. 2, the fuel gas flow paths 24P are shown to extend in parallel with the oxidized gas flow paths 25P in order to schematically show the structure of the single cell 28. However, in the separators 30 actually used for assembling the fuel cell, the ribs 54, 55 are respectively formed at both surfaces of each separator 30 such that the ribs 54 extend in the direction orthogonal to that of the ribs 55.

The electrolyte membrane 21 is a proton-conductive ion exchange membrane formed from a solid polymer material, e.g., fluororesin, and exhibits excellent electrical conductivity in the wet condition. A Nafion membrane (made by DUPONT) was used in this embodiment. Platinum or an alloy of platinum and another metal is applied as a catalyst to the surface of the electrolyte membrane 21.

The anode 22 and cathode 23 are both formed from a carbon cloth of carbon fiber threads formed by weaving. Note that, in this embodiment, the anode 22 and cathode 24 are formed from a carbon cloth. However, it is also preferable to form the anode 22 and cathode 24 from a carbon paper or carbon felt formed from carbon fiber.

As described above, the separator 30 has three coating layers formed on the metal substrate portion 60. The separator 30 has four hole structures in its peripheral portion, i.e., fuel gas holes 50, 51 for connecting the ribs 54 forming the fuel gas flow paths 24P to each other, and oxidized gas holes 52, 53 for connecting the ribs 55 forming the oxidized gas flow paths 25P to each other. In the assembled fuel cell, the fuel gas holes 50, 51 of each separator 30 respectively form a fuel gas supply manifold and a fuel gas exhaust manifold, which internally extend through the fuel cell in the stacking direction. Similarly, the oxidized gas holes 52, 53 of each separator 30 respectively form an oxidized gas supply manifold and an oxidized gas exhaust manifold, which also internally extend through the fuel cell in the stacking direction.

The fuel cell provided with the aforementioned members is assembled by sequentially laminating the separator 30, anode 22, electrolyte membrane 21, cathode 23 and separator 30 in this order, and placing current collector plates 36, 37, insulating plates 38, 39 and end plates 40, 41 onto both ends of the resultant lamination, respectively. The stacked structure 14 shown in FIG. 4, thus, is completed. The current collector plates 36, 37 are respectively provided with output terminals 36A, 37A capable of outputting the electromotive force produced in the fuel cell.

The end plate 40 has two hole structures as shown in FIG. 4, one is a fuel gas supply hole 42, and the other is an oxidized gas supply hole 44. The insulating plate 38 and current collector plate 36 that are adjacent to the end plate 40 each has similar two hole structures at the positions corresponding to the two hole structures of the end plate 40. The fuel gas supply hole 42 is formed at the center of the fuel gas hole 50 of the separator 30. Note that the fuel cell is operated with the fuel gas supply hole 42 connected to a not-shown fuel supply apparatus, so that hydrogen-rich fuel gas is supplied into the fuel cell. Similarly, the oxidized gas supply hole 44 is formed at the position corresponding to the center of the oxidized gas hole 52 of the separator 30. The fuel cell is operated with the oxidized gas supply hole 44 connected to a not-shown oxidized gas supply apparatus, so that oxygen-containing oxidized gas is supplied into the fuel cell. The fuel gas supply apparatus and oxidized gas supply apparatus serve to supply the respective gas humidified and pressurized by a predetermined amount into the fuel cell.

The end plate 41 has two hole structures, i.e., a fuel gas exhaust hole and an oxidized gas exhaust hole (both not shown), at the positions different from those of the end plate 40. The insulating plate 39 and current collector plate 37 each has two hole structures at the same positions as those of the end plate 41. One of the hole structures of the end plate 41, i.e., the fuel gas exhaust hole, is formed at the position corresponding to the center of the fuel gas hole 51 of the separator 30. The other hole structure, i.e., the oxidized gas exhaust hole, is formed at the position corresponding to the center of the oxidized gas hole 53 of the separator 30. The fuel cell is operated with a not-shown fuel gas exhaust apparatus connected to the fuel gas exhaust hole and a not-shown oxidized gas exhaust apparatus connected to the oxidized gas exhaust hole. As described above, the fuel gas flow paths 24P serving as the flow paths within the single cells, fuel gas supply manifold and fuel gas exhaust manifold are formed within the fuel cell. These flow paths communicate with each other within the fuel cell such that the fuel gas can flow from the fuel gas supply hole 42 to the fuel gas exhaust hole. Moreover, as described above, the oxidized gas flow paths 25P serving as the flow paths within the single cells, oxidized gas supply manifold and oxidized gas exhaust manifold are formed within the fuel cell. These flow paths communicate with each other within the fuel cell such that the oxidized gas can flow from the oxidized gas supply hole 44 to the oxidized gas exhaust hole.

The stacked structure 14 formed from the aforementioned members is held with predetermined pressing force applied thereto in the staking direction. Thus, the fuel cell is completed.

Hereinafter, the respective flow of the fuel gas and oxidized gas within the fuel cell provided with the aforementioned structure will be described. The fuel gas is introduced from the aforementioned predetermined fuel gas supply apparatus into the fuel cell through the fuel gas supply hole 42 formed in the end plate 40. Within the fuel cell, the fuel gas is supplied to the fuel gas flow paths 24P of each single cell 28 through the fuel gas supply manifold and provided for the electrochemical reaction proceeding at the anode of each single cell 28. The fuel gas discharged from the fuel gas flow paths 24P is collected at the fuel gas exhaust manifold and reaches the aforementioned fuel gas exhaust hole of the end plate 41, from which the fuel gas is discharged to the outside of the fuel cell into the predetermined fuel gas exhaust apparatus.

Similarly, the oxidized gas is introduced from the aforementioned predetermined oxidized gas supply apparatus into the fuel cell through the oxidized gas supply hole 44 formed in the end plate 40. Within the fuel cell, the oxidized gas is supplied to the oxidized gas flow paths 25P of each single cell 28 through the oxidized gas supply manifold and provided for the electrochemical reaction proceeding at the cathode of each single cell 28. The oxidized gas discharged from the oxidized gas flow paths 25P is collected at the oxidized gas exhaust manifold and reaches the aforementioned oxidized gas exhaust hole of the end plate 41, from which the oxidized gas is discharged into the predetermined oxidized gas exhaust apparatus.

Figure 5:
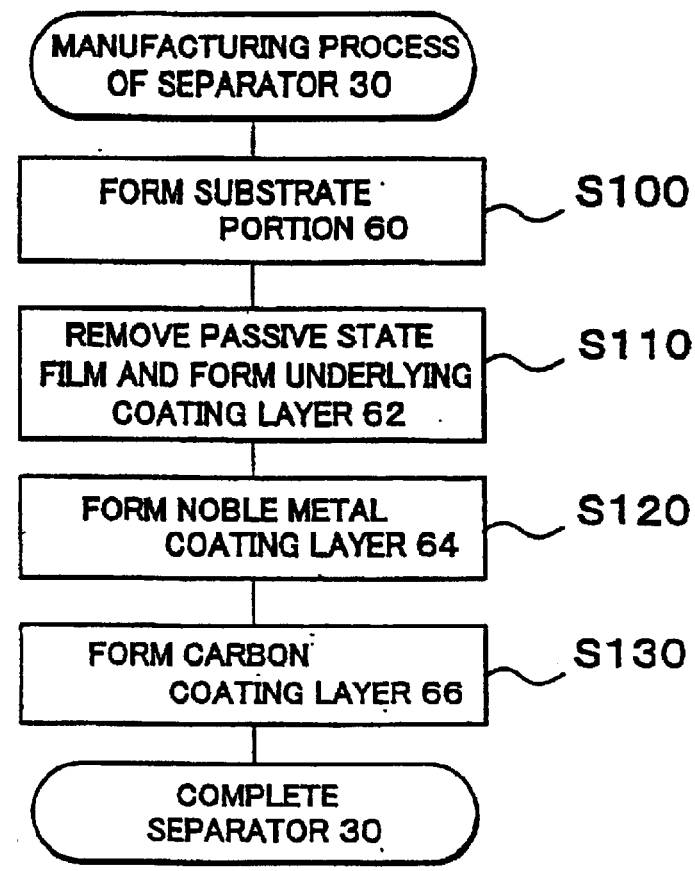
FIG. 5 is an illustration showing a manufacturing process of the separator.

(2) Structure and Manufacturing Process of Separator 30 of One Embodiment of the Invention, and Functions and Effects Thereof Hereinafter, the structure of the separator 30 provided in the fuel cell will be described. As described above, the separator 30 is provided with the substrate portion 60, underlying coating layer 62, noble metal coating layer 64, and carbon coating layer 66. FIG. 5 is an illustration showing the manufacturing process of the separator 30.

In manufacturing the separator 30, a thin stainless steel sheet is first mechanically pressed to form the substrate portion 60 having a predetermined concave-convex shape at both surfaces thereof (Step S100). The concave-convex shape formed at both surfaces of the separator 30 by the pressing is such a shape that can form the aforementioned fuel gas flow paths 24P and oxidized gas flow paths 25P in the fuel cell incorporating the separators 30 therein. A stretch-formed or bent stainless steel sheet, a half-sheared stainless steel sheet (i.e., a partially blanked stainless steel sheet) or the like may be used as the substrate portion 60 formed from a stainless steel sheet mechanically pressed into a predetermined concave-convex shape in Step S100.

Then, the substrate portion 60 obtained in Step S100 is subjected to surface treatment in order to remove a passive state layer formed at the surface of the stainless steel forming the substrate portion 60 and to form the underlying coating layer 62 of copper on the substrate portion 60 having the passive state layer removed therefrom (Step S110). Stainless steel has a non-conductive passive state layer at its surface. The underlying coating layer 62 is thus formed after removing the passive state layer in order to prevent reduction in conductivity of the separator 30 (i.e., increase in contact resistance with the noble metal coating layer 64 further formed on the substrate portion 60) due to such a passive state layer formed at the stainless steel surface. Note that the underlying coating layer 62 can be formed either by electroplating or electroless plating. In this embodiment, the underlying coating layer 62 is formed with a thickness of 10 $\mu$m.

After the underlying coating layer 62 is formed, the noble metal coating layer 64 of silver is formed on the surface thereof (Step S120). The noble metal coating layer 64 can be easily formed by a method such as electroplating or electroless plating. In this embodiment, the noble metal coating layer 64 is formed with a thickness of 2 $\mu$m.

After the noble metal coating layer 64 is formed, the carbon coating layer 66 formed from a member containing carbon materials is further formed on the surface thereof (Step S130). Thus, the separator 30 is completed. The carbon coating layer 66 contains graphite particles and carbon black as the carbon materials, and is formed from the carbon materials mixed with a binder. Examples of graphite as used herein include artificial graphite, crystalline graphite, flake graphite, earthy graphite and the like. Examples of carbon black as used herein include channel black, furnace black, acetylene black, ketjenblack and the like. For example, a resin-based material or rubber-based material that is stable enough in the internal environment of the fuel cell (under acidic conditions or a predetermined high temperature) may be used as the binder. Examples of the resin-based material include fluororesin, acrylic resin, polyester resin, urethane resin, phenol resin, phenol epoxy resin, and the like. Examples of the rubber-based material include styrenebutadiene rubber (SBR), isobutylene-isoprene rubber (IIR), ethylene-propylene rubber (EPDM), fluororubber, nitrile rubber (NBR), chloropropylene rubber (CR) and the like. One of these resin-based materials and rubber-based materials, or combination of a plurality of these resin-based materials and rubber-based materials may be used as the binder. The carbon coating layer 66 may be formed by immersing the substrate portion 60 having the underlying coating layer 62 and noble metal layer 64 formed thereon into the mixture of the carbon materials and melted binder, or by spraying this mixture onto the noble metal coating layer 64. The carbon coating layer 66 may be formed by another method such as sputtering. Alternatively, the mixture may be applied by curtain flow coating. Note that, in this embodiment, the carbon coating layer 66 is formed with a thickness of 40 $\mu$m.

Note that, in the foregoing description, the substrate portion 60 is press-formed to have a concave-convex shape for forming fuel gas flow paths 24P and oxidized gas flow paths 25P at the respective surfaces thereof. However, the substrate portion 60 may have another structure. For example, the substrate portion 60 may alternatively be formed from two thin plates laminated to each other, one of the thin plates having a concave-convex shape for forming the fuel gas flow paths 24P on its one surface, and the other having a concave-convex shape for forming the oxidized gas flow paths 25P on its one surface.

According to the separator 30 structured as such, the stainless steel substrate portion 60 is coated with the noble metal coating layer 64 of silver, and further coated with the carbon coating layer 66 containing carbon materials. As a result, a highly corrosion-resistant, highly conductive fuel cell gas separator can be obtained. Moreover, with such a separator 30, a highly durable fuel cell having sufficient cell performance can be obtained.

As described above, the fuel cell that is generating electricity has a strongly acidic internal environment. In such an environment, even a silver-coated separator may possibly be subjected to gradual corrosion of the silver itself that coats the separator. In this embodiment, however, the noble metal coating layer 64 of silver is further coated with the carbon coating layer 66. Therefore, silver is subjected to a milder environment (pH closer to neutral), so that corrosion of the metal coating layer 64 can be sufficiently suppressed. The carbon coating layer 66 is formed from the carbon materials bound with the binder, and prevents the surface of the noble metal coating layer 64 from being directly exposed to the internal environment of the fuel cell. The carbon materials forming the carbon coating layer 66 have a property of causing a minute amount of water to gradually penetrate therein. Moreover, a minute amount of water may possibly penetrate through the interface between the binder and the carbon materials. However, the carbon coating layer 66 provided on the noble metal coating layer 64 produces a sufficient proton concentration gradient between the surface of the noble metal coating layer 64 and the surface of the separator 30 (the surface of the carbon coating layer 66). Therefore, even if the separator 30 is located in the pH 2 environment, the surface of the noble metal coating layer 64 coated with the carbon coating layer 66 is subjected to a much milder environment (pH closer to neutral). Unlike being directly subjected to the internal environment of the fuel cell, silver that is a noble metal having a very low ionization tendency is stable enough in such an environment. Accordingly, even if the fuel cell has a strongly acidic internal environment and the water penetrates through the carbon materials of the carbon coating layer 66, corrosion of the noble metal coating layer 64 formed from silver does not progress during operation of the fuel cell. Corrosion of the noble metal coating layer 64 can thus be prevented, whereby corrosion of the underlying coating layer 62 and substrate portion 60 coated with the noble metal layer 64 can also be sufficiently suppressed. The carbon coating layer 66 formed from the carbon materials and binder also has sufficient corrosion resistance. Therefore, the separator 30 exhibits high corrosion resistance as a whole, whereby a sufficiently durable fuel cell can be obtained using the separator 30.

Note that, in addition to the aforementioned effect of sufficiently suppressing the progress in corrosion of the noble metal coating layer 64, the carbon coating layer 66 containing the carbon materials also has an effect of preventing even a slight amount of metal ions (silver ions) eluted from the surface of the noble metal coating layer 64 due to corrosion over the long-time power-generating operation of the fuel cell from being discharged to the outside of the separator through the carbon coating layer 66. Thus, by forming the noble metal layer 64 from silver having high corrosion resistance, and coating the noble metal coating layer 64 with the carbon coating layer 66 containing the carbon materials, the progress in corrosion of the separator (a metal portion forming the separator) can be suppressed, as well as the problems caused by a slight amount of metal ions can also be suppressed. As a result, a highly durable fuel cell can be obtained with such a separator 30.

Moreover, silver forming the noble metal coating layer 64 is not oxidized to form a passive state film. Therefore, even if the water penetrates through the carbon materials of the carbon coating layer 66 down to the surface of the noble metal coating layer 64, the noble metal coating layer 64 does not form a passive state layer at its surface due to oxidation with the water. Accordingly, conductivity of the separator 30 is not reduced. More specifically, in the presence of the water and oxygen, a metal may not only be corroded to elute metal ions, but may form an oxide film with insufficient conductivity at its surface. However, silver, which is a noble metal, is highly stable, and therefore has weak affinity to oxygen and does not form a passive state film. The underlying coating layer 62 formed under the noble metal coating layer 64 is coated with the noble metal coating layer 64. Therefore, the underlying coating layer 62 also does not form a passive state layer at its surface that causes reduction in conductivity of the separator 30. Moreover, stainless steel forming the substrate portion 60 is originally covered with a passive state layer at its surface. However, the underlying coating layer 62 is formed on the substrate portion 60 after the passive state layer is removed. Therefore, the conductivity of the separator 30 is not reduced due to the passive state layer at the surface of the substrate portion 60. It should be understood that the carbon materials contained in the carbon coating layer 66 do not form a passive state layer in the cell environment. Therefore, neither the contact resistance at the surface of the separator 30 nor the internal resistance of the fuel cell provided with the separator 30 increases during operation of the fuel cell. Note that such metal corrosion and passivation will be described later in more detail.

Note that, as described below, gold having the lowest ionization tendency in the noble metals neither corrodes nor forms a passive state film, and it is extremely stable even in the internal environment of the fuel cell. Accordingly, sufficient corrosion resistance of the fuel cell gas separator can also be ensured by forming on the separator a noble metal layer formed from gold and being thick enough to protect the substrate portion. However, the structure of this embodiment enables sufficient reduction in the manufacturing cost of the separator. More specifically, according to the structure of this embodiment, the noble metal coating layer 64 is coated with the carbon coating layer 66 containing the carbon materials. Therefore, the noble metal layer, i.e., the noble metal coating layer 64, can be made much thinner than (i.e., the amount of noble metal can be made much lower than) that of a noble metal layer required to protect the substrate portion with gold. Moreover, since the noble metal coating layer 64 is coated with the carbon coating layer 66, gold is not necessarily used. As a result, sufficient corrosion resistance can be realized by the noble metal coating layer 64 formed from silver that is a lower-grade (less noble), but less expensive noble metal than gold.

It should be appreciated that, even if the noble metal coating layer 64 is formed from gold instead of silver in the separator 30 of this embodiment, the gold layer (the noble metal coating layer 64) can be made much thinner than in the structure that ensures the corrosion resistance of the separator only with a noble metal layer of gold. As a result, a separator having sufficient corrosion resistance can be obtained at reduced cost.

Note that a metal plating layer has pinholes (small holes) (hereinafter, referred to as micro plating-defects). A layer located under the plating layer may possibly be subjected to corrosion through these micro plating-defects. Therefore, in general, a sufficient thickness of the plating layer is ensured in order to reduce the number of micro defects in the plating layer, thereby preventing such corrosion of the layer located under the plating layer. The separator 30 of this embodiment has the underlying coating layer 62 of copper between the noble metal coating layer 64 and substrate portion 60. Copper has a relatively low ionization tendency among the base metals. Therefore, even if the noble metal coating layer 64 has some micro plating-defects therein, the underlying coating layer 62 protects the substrate portion 60. Accordingly, the corrosion resistance of the substrate portion 60 and thus of the whole separator 30 can be ensured while reducing the thickness of the noble metal coating layer 64. It should be appreciated that the underlying coating layer 62 is not necessarily provided if the noble metal coating layer 64 is thick enough to protect the substrate portion 60. The respective thickness of the noble metal coating layer 64 and underlying coating layer 62 as well as presence/absence of the underlying coating layer 62 may be selected as appropriate according to the cost required to make the noble metal coating layer 64 formed from a noble metal thick enough to prevent corrosion, the cost required to form the underlying coating layer 62 after plating the substrate portion 60 with a base metal, the degree of corrosion resistance required, and the like. Note that, in addition to the aforementioned effect of protecting the substrate portion 60, the underlying coating layer 62 also has an effect of improving the adhesion between the substrate portion 60 and noble metal coating layer 64.

In the separator 30 of this embodiment, the substrate portion 60 is formed from stainless steel. However, the substrate portion 60 may alternatively be formed from another metal having excellent conductivity and formability such as aluminum. In the case where the substrate portion 60 is formed from a metal having a large ionization tendency such as aluminum, it is difficult to plate the substrate portion 60 directly with a noble metal having a very low ionization tendency (because the substrate portion 60 may be corroded by the plating bath). Therefore, the underlying coating layer 62 formed from a base metal having a lower ionization tendency can facilitate formation of the noble metal coating layer 64 of a noble metal.

Figure 6:
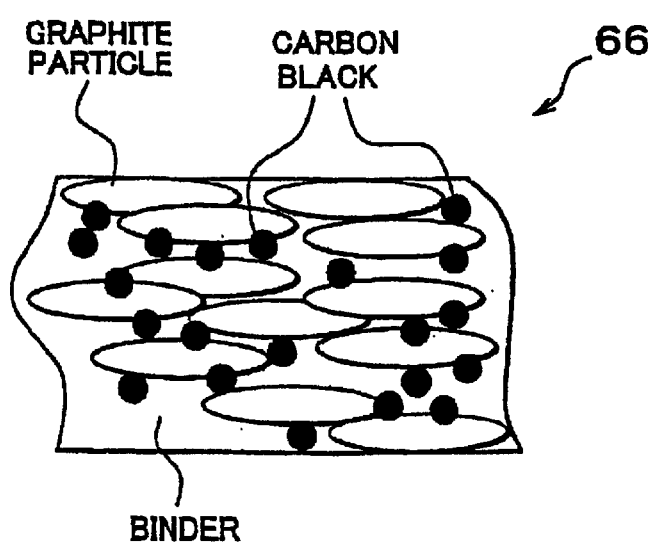
FIG. 6 is an illustration schematically showing the structure of a carbon coating layer.

FIG. 6 is an illustration schematically showing the structure of the carbon coating layer 66 containing the carbon materials. As shown in FIG. 6, the carbon coating layer 66 is formed from graphite particles having carbon black particles of smaller size therebetween. Sufficient overall conductivity of the carbon coating layer 66 is ensured by the carbon materials connected and stacked on each other in the thickness direction of the carbon coating layer 66. The binder for binding the carbon materials is highly corrosion resistant, and fills the space between the carbon material particles so as to prevent the water from penetrating through the space between the carbon particles. Thus, with a sufficient amount of binder, the amount of water reaching the noble metal coating layer 64 can be sufficiently reduced, whereby the overall corrosion resistance of the separator 30 can be improved. Accordingly, the respective amounts of carbon materials and binder contained in the carbon coating layer 66 may be selected as appropriate within the range that is capable of ensuring sufficient overall conductivity of the carbon coating layer 66.

Note that the separator 30 need only have sufficient conductivity in a region that is in contact with an adjacent member within the fuel cell. Accordingly, the carbon coating layer 66 need only have a sufficient amount of carbon materials at least in the region that is in contact with the adjacent member, and does not necessarily have a sufficient amount of carbon materials in the other regions. In a region that is not associated with the conductivity of the separator, a sufficient amount of binder need only be provided, whereby the underlying metal layer can be protected as well as corrosion thereof can be suppressed. The carbon coating layer 66 containing the carbon materials may be formed without using the binder as long as its capability of shielding and protecting the underlying layer from the environment outside the separator can be desirably ensured. For example, thermal expansion graphite is a well-known carbon material having a layer structure, and can be bound together only by pressing without using the binder. Provided that the amount of water penetrating through the pressed thermal expansion graphite layer is within the allowable range, the carbon coating layer 66 may be formed from the thermal expansion graphite pressed without using the binder.

In the above embodiment, the carbon coating layer 66 is formed directly onto the noble metal coating layer 64. However, a predetermined coating layer may further be formed between the noble metal coating layer 64 and carbon coating layer 66. Even if such a coating layer is formed from, e.g., a metal having sufficient corrosion resistance and conductivity, the aforementioned effects of this embodiment can be obtained. Moreover, such a coating layer protects the underlying layer such as noble metal coating layer 64, whereby the adhesion between the noble metal coating layer 64 and carbon coating layer 66 can be improved.

(3) Description Regarding Corrosion Property of the Metals

Hereinafter, the relation between a metal capable of forming the separator and corrosion and passivation will be described. As described above, corrosion is a phenomenon that a metal is oxidized in the environment containing the water, oxygen or the like to elute metal ions. such a corrosion means a phenomenon that a metal is deteriorated due to oxidation of the metal. Regarding the phenomenon where a metal is oxidized, particularly, passivation means that a metal surface is oxidized into an oxide film (a passive state film). As described above, metal ions eluted from a corroded metal penetrate into a solid polymer electrolyte membrane, thereby degrading the cell performance.

Moreover, insufficient conductivity of a passive state film reduces the conductivity of the separator (increases the contact resistance between the separator and an adjacent member), thereby degrading the cell performance. Accordingly, in order to make the separator corrosion-resistant enough to prevent reduction in performance of the fuel cell, the separator has to be less susceptible to the corrosion (i.e., has to be highly corrosion-resistant) and also must have high conductivity (i.e., must not form a passive state film).

Whether a metal is subjected to corrosion or passivation is determined by the type of reaction that stabilizes the energy state of the metal and also by the reactivity of the metal. More specifically, in the case where corrosion stabilizes the energy state of the metal, the corrosion proceeds therein. In the case where passivation stabilizes the energy state, a passive state film is formed. If the energy state is stable in such a condition that does not cause such reactions, neither corrosion nor passivation occurs. In the case where the energy state is stable in such a condition that causes corrosion or passivation, the rate of that reaction is determined by the ionization tendency of the metal and its affinity to oxygen.

Stabilization properties of the metal may be determined by such factors as to which reaction occurred, and as to whether or not the reaction occurs. Such properties of various kinds of metals are shown in FIGS. 7A to 7J, FIGS. 8A to 8L, FIGS. 9A to 9L and FIGS. 10A to 10I. FIGS. 7A to 7J, FIGS. 8A to 8L, FIGS. 9A to 9L and FIGS. 10A to 10I show the conditions that make the respective metals more stable under various environments with different pH values and potentials. These figures are hereinafter referred to as corrosion diagrams. In these corrosion diagrams, a region where corrosion stabilizes the energy state of the metal is referred to as a corrosion region. A region where passivation that involves oxygen stabilizes the energy state is referred to as a passive state region. A region where the energy state is stable in such a condition that does not cause such reactions is referred to as a stable region. Note that the corrosion diagrams shown in FIGS. 8A to 8L, FIGS. 9A to 9L, and FIGS. 10A to 10I have the same hatching patterns as those of FIGS. 7A to 7J for the corrosion, passive state, and stable regions.

The corrosion diagram shown in FIG. 7A as well as the other corrosion diagrams shown in FIGS. 7A to 7J, FIGS. 8A to 8L, FIGS. 9A to 9L and FIGS. 10A to 10I have a parallelogram-shaped region in the center. This region is a region where the water can exist in a stable state (hereinafter, referred to as a water stabilizing region). Under the conditions other than the water stabilizing region, the water is progressively decomposed into hydrogen and oxygen. In the fuel cell, the water is produced as the electrochemical reaction proceeds within the fuel cell (see formulas (1) to (3)). Therefore, the internal environment of the fuel cell is considered to be within the water stabilizing region. As described above, it is said that the internal environment of the fuel cell gradually changes toward the acidic state and reaches pH 2. Accordingly, in the corrosion diagrams of FIGS. 7A to 7J, a region corresponding to the internal environment of the fuel cell (hereinafter, virtually referred to as a fuel cell region) is considered to be included in the range of pH 2 to pH 7 within the water stabilizing region. The effects of the internal environment of the fuel cell on the metal can be known according to which one of the corrosion, passive state, and stable regions the metal belongs to in the aforementioned region that is considered to include the fuel cell region. Moreover, whether or not the metal can be used as a fuel cell gas separator can be examined by considering the reactivity of the metal based on the corrosion diagrams.

As shown in FIGS. 7A to 7J, noble metals that are the stable metals less susceptible to oxidation and the like have a large stable region within the water stabilizing region. Accordingly, the separator coated with such a noble metal can maintain its sufficient conductivity. In particular, gold has a stable region in the entire water stabilizing region. Therefore, it is considered that gold itself neither corrodes nor forms a passive state film even if it is directly exposed to the internal environment of the fuel cell. Among the noble metals, the platinum-group noble metals such as iridium, platinum, rhodium, ruthenium and palladium have a passive state region within the water stabilizing region. Therefore, it is considered that passivation may stabilize the energy state of such noble metals in the internal environment of the fuel cell. However, these noble metals have very small affinity to oxygen. Therefore, even when the internal environment of the fuel cell corresponds to the passive state region, the passive state film is actually formed at a very low rate. Accordingly, by forming the noble metal coating layer 64 of the aforementioned embodiment from such a noble metal, the surface of the noble metal coating layer 64 further coated with the carbon coating layer 66 containing the carbon materials is subjected to a milder environment. Therefore, the noble metal coating layer 64 is not subjected to corrosion, and also formation of the passive state film can be sufficiently prevented. As a result, an excellent separator that is neither subjected to corrosion nor reduction in conductivity can be obtained.

Among the noble metals, silver has a corrosion region within the water stabilizing region. Therefore, in the internal environment of the fuel cell, the energy state of silver may possibly be stabilized in such a condition that the metal ions are eluted due to corrosion. However, silver, which is a noble metal, has a very low ionization tendency. Therefore, even when the internal environment of the fuel cell corresponds to the corrosion region, the corrosion actually proceeds at a very low rate. Accordingly, by forming the noble metal coating layer 64 of the aforementioned embodiment from a noble metal like silver, the surface of the noble metal coating layer 64 further coated with the carbon coating layer 66 containing the hydrogen materials is subjected to a milder environment. Therefore, the corrosion rate of the noble metal is further reduced. Thus, not only the noble metal coating layer 64 does not form a passive state film, but also the progress in corrosion can be sufficiently prevented. As a result, an excellent separator that is neither subjected to corrosion nor reduction in conductivity can be obtained.

As shown in FIGS. 8A to 8L, FIGS. 9A to 9L and FIGS. 10A to 10I, in the case of the base metals, most of the water stabilizing region is occupied by the corrosion region or passive state region. The base metals have a much larger ionization tendency as compared to the noble metals. Therefore, even in a milder environment (pH closer to neutral), the base metals are corroded at a high rate as long as they are in the corrosion region. Moreover, the base metals have much greater affinity to oxygen as compared to the noble metals. Therefore, even in a milder environment, the base metals form a passive state film at a high rate as long as they are in the passive state region. As described above, by forming the noble metal coating layer 64 from a noble metal at least as high-grade (noble) as silver, the noble metal coating layer 64 that is a noble metal layer capable of having a reduced thickness, and the carbon-containing carbon coating layer 77 are provided, whereby sufficient corrosion resistance of the metal separator can be ensured.

(4) Experimental Evaluation of Various Materials Applied to Separator 30

(4-1) Measurement of Contact Resistance and Corrosion Current

The experimental result regarding the corrosion resistance and conductivity (contact resistance) of the separators having the noble metal coating layer 64 of a noble metal and the carbon coating layer 66 containing the carbon materials will now be described. FIG. 11 is an illustration showing the examination result regarding the capability of various metals selected as noble metals forming the noble metal coating layer 64 and base metals forming the underlying coating layer 62. The following separators were herein used for comparison: a separator having a 0.01 μm-thick noble metal coating layer 64 of gold and an underlying coating layer 62 of nickel (separator A); a separator having a 0.01 μm-thick noble metal coating layer 64 of gold and an underlying coating layer 62 of copper (separator B); a separator having a 2 μm-thick noble metal coating layer 64 of silver and an underlying coating layer 62 of copper (separator C); and a separator having a 10 μm-thick tin layer (corresponding to the noble metal coating layer 64) and an underlying coating layer 62 of nickel (separator D). Note that, in separator D, tin is not a noble metal. However, in order to evaluate the capability of the noble metal layer, separator D was prepared with the layer corresponding to the noble metal coating layer 64 being formed from tin that is not a noble metal. In addition to separators A to D that have a carbon coating layer 66 containing carbon materials, separators (separators A' to C') corresponding to the aforementioned respective separators (separators A to C) but having no carbon coating layer 66 were also prepared for comparison. Note that, in the separators shown in FIG. 11, the underlying coating layer 62 was formed with a thickness of 10 μm, the carbon coating layer 66, if provided, was formed with a thickness of 10 μm, and the substrate portion 69 was formed from aluminum.

FIG. 11 shows the examination result of each of the aforementioned separators regarding the increase in contact resistance resulting from passivation, and the corrosion current resulting from corrosion. The examination result regarding the change in contact resistance shows the change in contact resistance before and after each separator was exposed to the environment similar to the internal environment of the fuel cell for a predetermined time. More specifically, separators A to D having the carbon coating layer 66 were immersed in sulfuric acid of pH 2 at 80° C. for 100 hours, and separators A' to C' having no carbon coating layer 66 were immersed in a buffer solution of pH 2 at 80° C. for 24 hours, so that the change in contact resistance before and after immersion was measured for each separator. Measurement of the contact resistance of the separators was conducted as follows: each separator was laminated with a carbon cloth (corresponding to the gas diffusion electrode that is an adjacent member within the aforementioned single cell 28) and the resultant lamination was held with pressing force applied thereto. Then, a constant current (1A) was applied thereto, whereby a voltage drop was measured. A resistance value was obtained from the current and voltage values, whereby the change in the resistance value (the resistance value multiplied by the contact area) before and after the aforementioned acid treatment was examined (unit: mΩcm$^2$). Note that herein is measured the overall resistance value of the lamination of the separator and gas diffusion electrode that is held with the pressing force applied thereto. Thus, the comparison was made by using the overall resistance values integrating the contact resistance produced at the separator surface and being affected by the pressing force and the like, in order to reflect the condition of the fuel cell stack.

Figure 12:
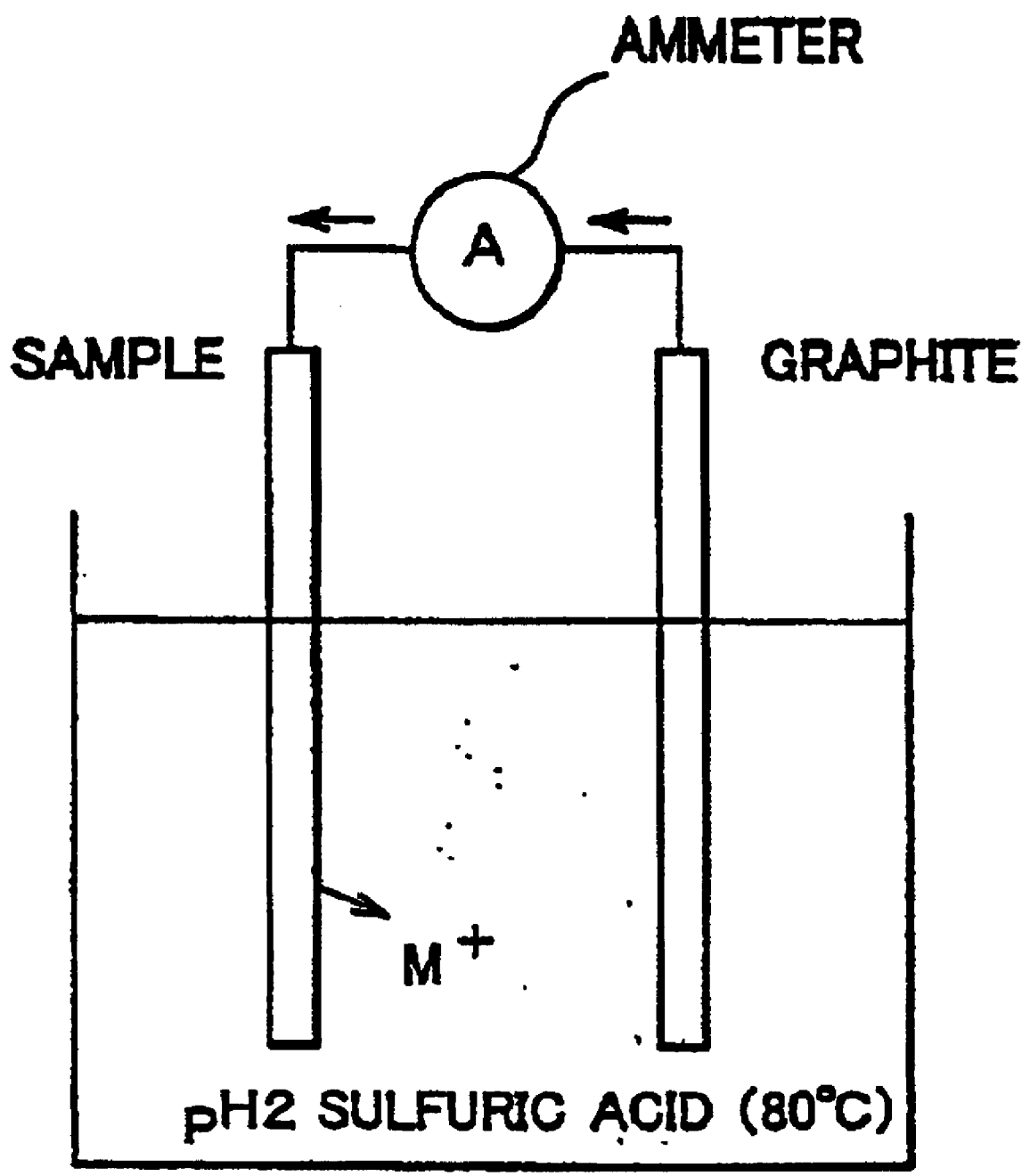
FIG. 12 is an illustration showing the state where a corrosion current is measured.

The examination result regarding the corrosion current shows whether or not a corrosion current is produced in the environment similar to the internal environment of the fuel cell. The presence/absence of corrosion can be determined from this result. FIG. 12 is an illustration showing the state where the corrosion current of each separator is measured. Measurement of the corrosion current was conducted as follows: each sample separator was used as one electrode, and a graphite electrode was used as a counter electrode. In sulfuric acid of pH 2 at 80° C., a current (per unit area) flowing between the separator and graphite electrode which were electrically connected to each other was measured as corrosion current. Here, it is to be noted that the corrosion current is evaluated as a current density (unit: μA/cm$^2$) obtained by converting the value of the current flowing when the graphite electrode is used as an opposing electrode as described above to a value per unit area of the separator. The measurement values of the respective separators are enclosed in the rectangles in FIG. 11. In the case where the corrosion proceeds in the separator of interest, metal ions (shown by M$^+$ in FIG. 12) are eluted from the sample separator with the progress in corrosion, and a current flows therein. In the case where the separator of interest does not corrode in the aforementioned solution, the theoretical corrosion current is zero. However, even if the corrosion hardly proceeds, the actual measurement value rarely becomes zero. In the result shown in FIG. 11, the negative measurement values of the corrosion current are denoted with the symbol "○" in the figure, determining that the separator has not corroded and has sufficient corrosion resistance even on the long-term basis. The positive, but very small measurement values of the corrosion current are denoted with the symbol "Δ", determining that the separator is subjected to the corrosion at a very low rate and therefore may be durable as a separator. The positive, larger measurement values of the corrosion current are denoted with the symbol "x", determining that the separator has corroded to an unacceptable degree. Note that such a corrosion current was measured after 100-hour immersion in sulfuric acid of pH 2 at 80° C. for the separators having the carbon coating layer 66 containing the carbon materials (separators A, B, C, D), and was measured after 24-hour immersion in the same sulfuric acid for the separators having no carbon coating layer 66 (separators A', B', C').

As shown in FIG. 11, regarding separators A, B, C (separator A having a noble metal coating layer 64 of gold, an underlying coating layer 62 of nickel and a carbon coating layer 66 of the carbon materials; separator B having a noble metal coating layer 64 of gold, an underlying coating layer 62 of copper and a carbon coating layer 66 of the carbon materials; and separator C having a noble metal coating layer 64 of silver, an underlying coating layer 62 of copper and a carbon coating layer 66 of the carbon materials), each separator has a sufficiently small contact resistance, and also exhibits only a small increase in contact resistance even after the aforementioned sulfuric-acid treatment. Moreover, each separator has a sufficiently small corrosion current even after 100-hour immersion in the sulfuric acid. On the other hand, separators A' to C' respectively corresponding to separators A to C but having no carbon coating layer 66 have a contact resistance lower than that of separators A to C. However, separators A' to C' have a corrosion current that is much larger than that of separators A to C after 24-hour immersion in the sulfuric acid. Separator D having a tin layer corresponding to a noble metal coating layer 64, an underlying coating layer 62 of nickel and a carbon coating layer 66 of the carbon materials has a carbon coating layer 66 of the carbon materials, and therefore has a low corrosion current. However, since the layer corresponding to the noble metal layer 64 is not a noble metal layer, separator D has a large contact resistance. Thus, the increase in contact resistance can be sufficiently suppressed with the separator surface being coated with a thin noble metal layer. However, in order to sufficiently suppress the corrosion, the surface of the thin noble metal layer (e.g., thickness of 0.01 μm or more) must further be coated with the carbon coating layer 66 containing the carbon materials. Note that gold that forms the respective noble metal coating layers 64 of separators A' and B' do not corrode substantially, and silver that forms the noble metal coating layer 64 of separators C' also hardly corrodes on the short-term basis. Accordingly, the respective corrosion currents of separators A' to C' in FIG. 11 result from corrosion of the metals forming the underlying coating layer 62 and substrate portion 60.

Figure 9A:
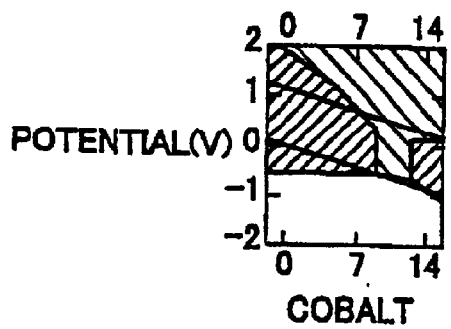
FIGS. 9A to 9L are illustrations showing the properties of various metals associated with corrosion.
Figure 9B:
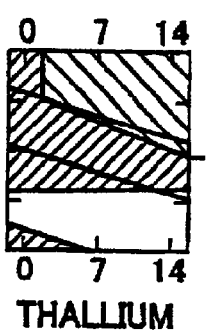
Figure 9C:
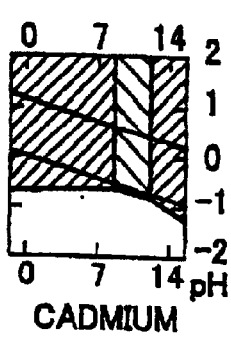
Figure 9D:
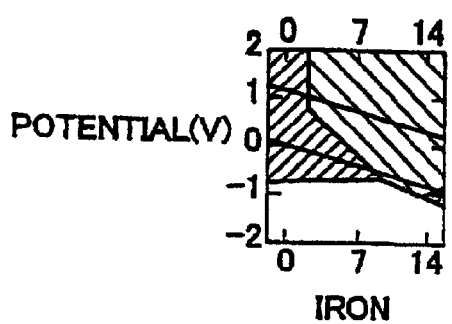
Figure 9E:
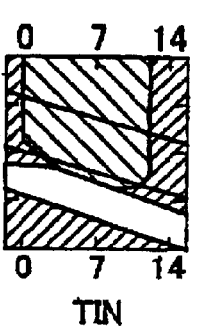
Figure 9F:
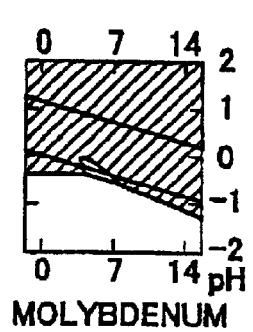
Figure 9G:
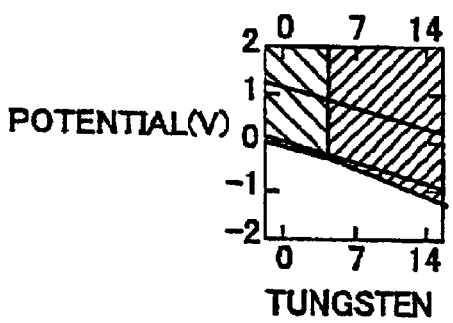
Figure 9H:
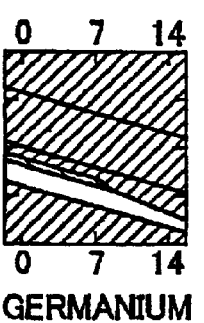
Figure 9I:
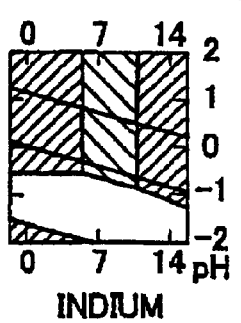
Figure 9J:
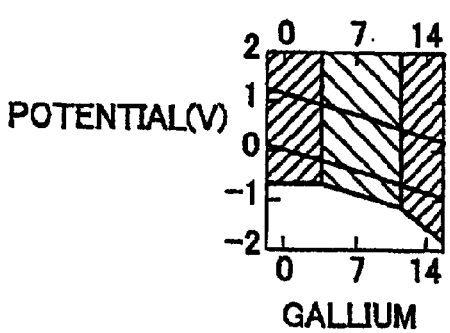
Figure 9K:
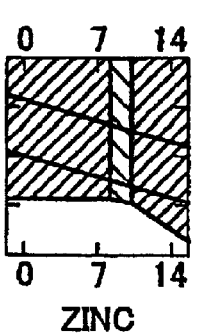
Figure 9L:
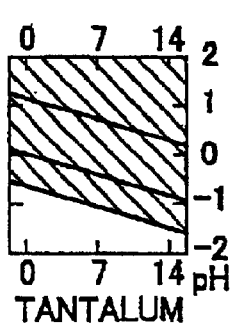

Unlike the aforementioned result, in the case where the layer corresponding to the noble metal coating layer 64 is formed from a base metal, corrosion or passivation proceeds even in the separator having its surface coated with the carbon coating layer 66 containing the carbon materials, according to the property of the base metal forming the layer corresponding to the noble metal coating layer 64 (as shown in FIGS. 7A to 7J, FIGS. 8A to 8L, FIGS. 9A to 9L, and FIGS. 10A to 10I). In separator D shown in FIG. 11, which has a tin layer corresponding to the noble metal coating layer 64 and an underlying coating layer 62 of nickel, a corrosion current is not produced, but a contact resistance is very large. Therefore, separator D is not suitable as the fuel cell gas separator. As shown in FIG. 9E, tin has a passive state region in the entire region that is considered to include the fuel cell region within the water stabilizing region. Therefore, even if the tin layer corresponding to the noble metal coating layer 64 is coated with the carbon coating layer 66, it forms a passive state film over the whole surface. Note that tin having a passive state film formed at the surface protects the underlying layer from corrosion by means of the passive state film. Therefore, a corrosion current is not produced in separator D.

(4-2) Measurement of the Metal Ion Elution Amount:

FIGS. 13A to 13D show the ion elution test results regarding separators A, C, A' and C', respectively. Herein, each separator was immersed in sulfuric acid of pH 2 at 80° C. for 24 hours, and the amount of metal ions eluted into the sulfuric acid due to corrosion (i.e., ions of the respective metals forming the noble metal coating layer 64, underlying coating layer 62, and substrate portion 60) was measured. Note that, in FIGS. 13A to 13D, only one of the surfaces of the substrate portion is shown to be coated in each separator. Actually, however, the entire surface of each separator is coated with the underlying coating layer 62, noble metal coating layer 64, carbon coating layer 66 or the like. The numerical values in the figures indicate the respective amounts of metal ions eluted into the sulfuric acid during 24 hours per unit area of the separator (unit: $\mu$mol/cm$^2$·day).

Figure 13A:
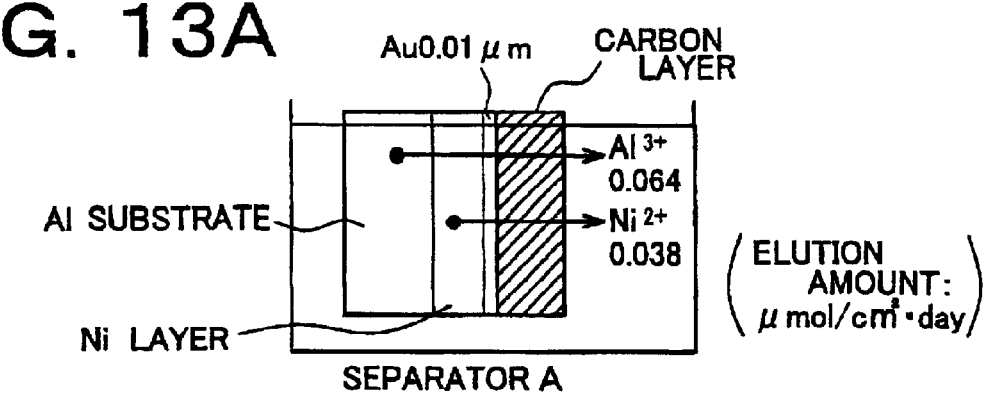
FIGS. 13A to 13D are illustrations showing the ion elution test result of the separators formed from various selected metals.
Figure 13B:
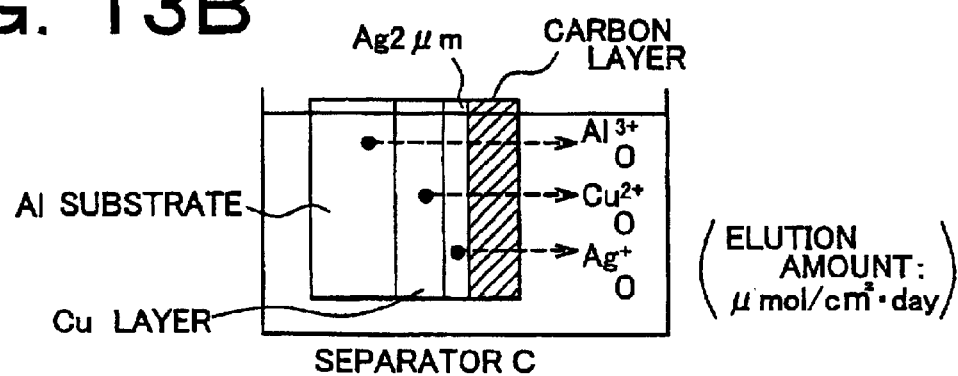
Figure 13C:
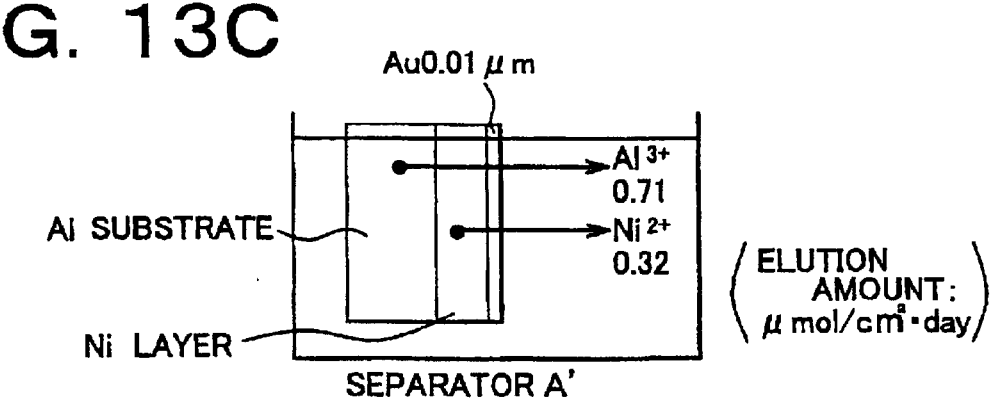
Figure 13D:
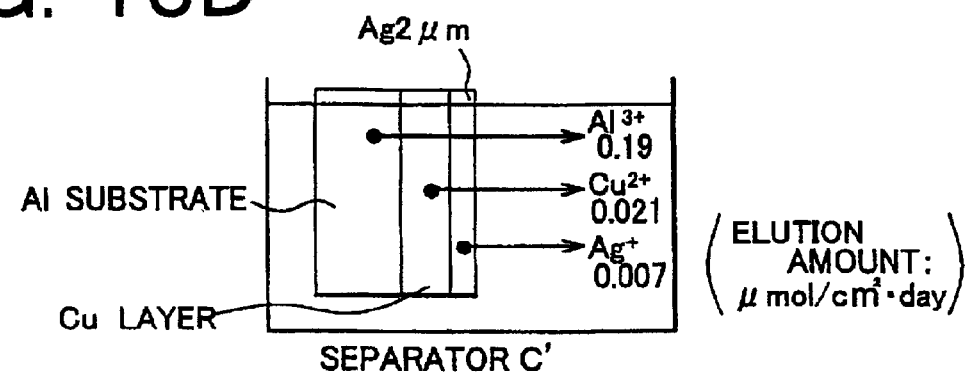

As shown in FIGS. 13C and 13D, although separators A', C' are each coated with the noble metal layer 64 and underlying coating layer 62, aluminum forming the substrate portion 60 are eluted as ions in a significant amount. Note that gold forming the noble metal coating layer 64 of separator A' is in the stable region, and therefore is not eluted. However, silver forming the noble metal coating layer 64 of separator C' is in the corrosion region. Therefore, a slight amount of elution is detected despite the fact that silver is a noble metal. Although separators A', C' both have the noble metal coating layer 64 formed from a noble metal, separator C' having a thicker noble metal coating layer 64 elutes a smaller amount of metals forming the underlying coating layer 62 and substrate portion 60 located under the metal coating layer 64. The reason for this is considered as follows: with a larger plating thickness, the number of micro plating-defects is reduced, whereby the underlying layers can be protected more sufficiently.

In contrast to separators A' and C', as shown in FIGS. 13A and 13B, separators A and C have the carbon coating layer 66 for coating the noble metal coating layer 64, i.e., a noble metal layer. Therefore, the metal ions are hardly eluted, whereby corrosion of the separator can be highly effectively suppressed. Note that comparison between the respective results of separators A and C in FIGS. 13A and 13B shows that separator C eluted a smaller amount of metal ions, which is less than the detection limit. This is considered because the thicker noble metal coating layer 64 as a noble metal layer can enhance the effect of preventing elution of the metal ions (corrosion).

Figure 14:
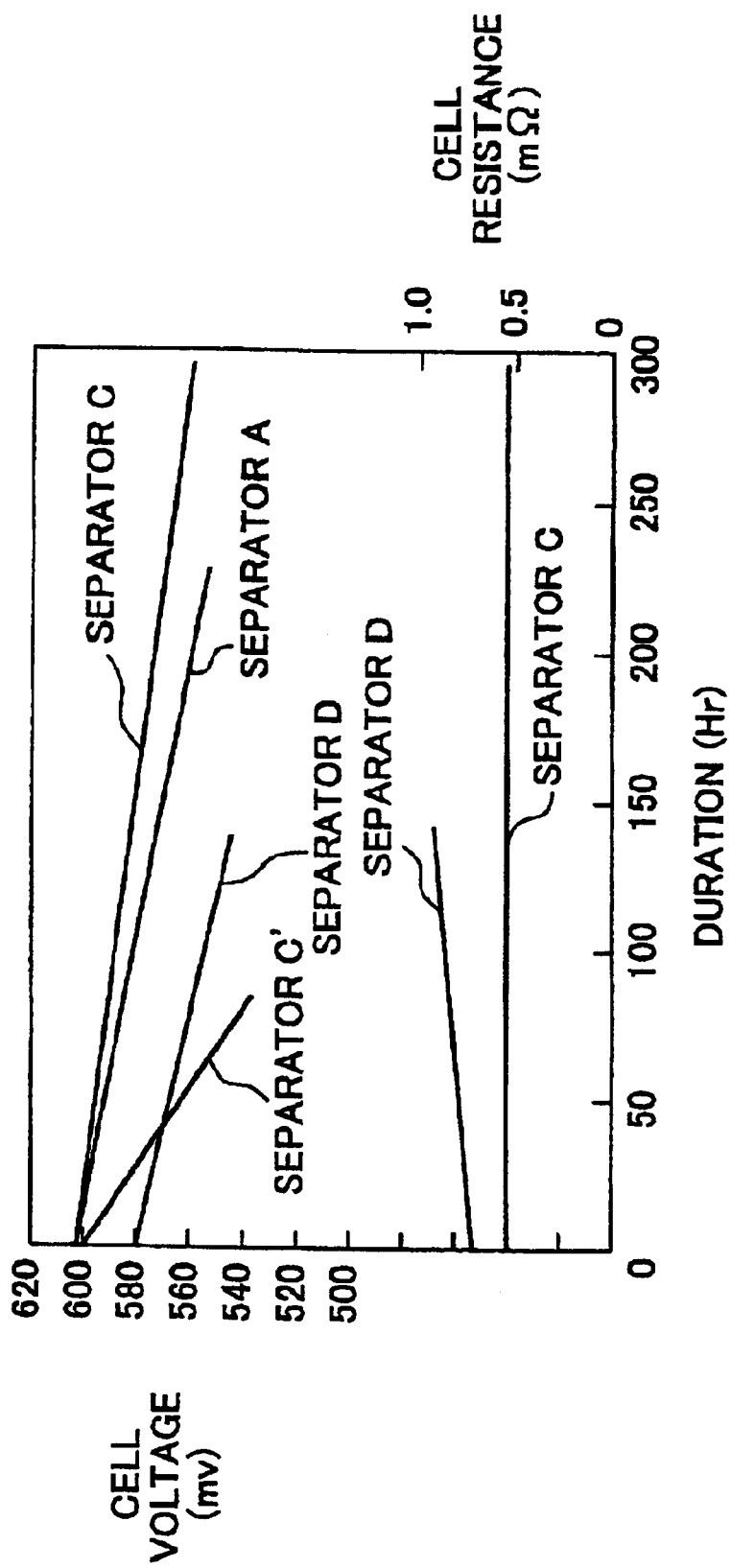
FIG. 14 is an illustration showing the examination result regarding the performance of the fuel cells formed with various separators.

(4-3) Performance Evaluation of Fuel Cells:

The examination result regarding the performance of the fuel cells formed with these separators is shown in FIG. 14. FIG. 14 shows the result regarding the change in output voltage from the single cell as well as the change in overall resistance value of the single cell. Regarding the single cells respectively formed with the aforementioned separators A, C, D and C', the change in output voltage was measured with a predetermined load being connected to each single cell for power-generating operation. Moreover, regarding the single cells respectively provided with separators C and D, the change in overall resistance value of the single cell was measured by conducting the power-generating operation using each single cell. The output voltage of the single cell is reduced as the metal ions penetrate into the electrolyte membrane due to the corrosion, and also reduced with increase in contact resistance of the separator. Therefore, the corrosion and passivation states of the separator can be evaluated from the change (reduction) in output voltage value. Passivation can be evaluated from the change in overall resistance value of the single cell that is also shown in FIG. 14.

As shown in FIG. 14, the single cells respectively formed with separators A and C exhibit a highly gentle voltage drop even after the continuous power-generating operation for a long time. Moreover, in the single cell formed with separator C, the resistance value is not increased during power-generating operation. Accordingly, these separators have excellent corrosion resistance, and also can maintain their high conductivity. In contrast, in the single cell formed with separator D, the voltage drop with time is not so large, but the output voltage itself is low. Moreover, in the single cell formed with separator D, the resistance value is significantly increased during power-generating operation. This indicates that, in the single cell formed with separator D, the separator is protected from corrosion by a passive state layer formed at the surface of the tin layer corresponding to the noble metal coating layer 64, but the contact resistance (internal resistance of the fuel cell) is increased due to the passive state layer. The single cell formed with separator C' exhibits a significant voltage drop during power-generating operation. This indicates that, since the separator is not protected by the carbon coating layer 66 containing the carbon materials, the metals forming the respective layers of the separator are eluted as ions into the electrolyte membrane, thereby reducing the proton conductivity.

Silver that is a noble metal is in the corrosion region, but the corrosion rate thereof is very low. Therefore, by forming the silver layer for coating the surface with a larger thickness in separator C', elution of the metal ions from the underlying base metal layer can be suppressed. It is generally said that, in the metal plating, the micro plating-defects become close to the saturated state at the plating thickness of about 10 μm. If the separator is coated with a silver plating film having a thickness equal to or larger than about 10 μm, elution of the base metals forming the underlying layers can be prevented, whereby a separator having a certain degree of corrosion resistance can be obtained. In contrast, by further providing the carbon coating layer 66 containing the carbon materials as in this embodiment, a highly corrosion-resistant separator can be obtained that is capable of having a reduced thickness of the noble metal layer (noble metal coating layer 64) formed from silver or the like, and that is also unsusceptible to corrosion of the noble metal (silver) even in the long term even if the noble metal is in the corrosion region.

Note that in the corrosion diagrams shown in FIGS. 8A to 8J, carbon has a large corrosion region in the entire water stabilizing region. However, carbon has very small affinity to oxygen. Therefore degradation due to corrosion need not be considered even if it is exposed to the internal environment of the fuel cell. Moreover, even if carbon causes the corrosion reaction together with oxygen, this reaction produces carbon dioxide and therefore does not cause any adverse effect within the fuel cell. Thus, corrosion of carbon need not be considered.

Figure 15:
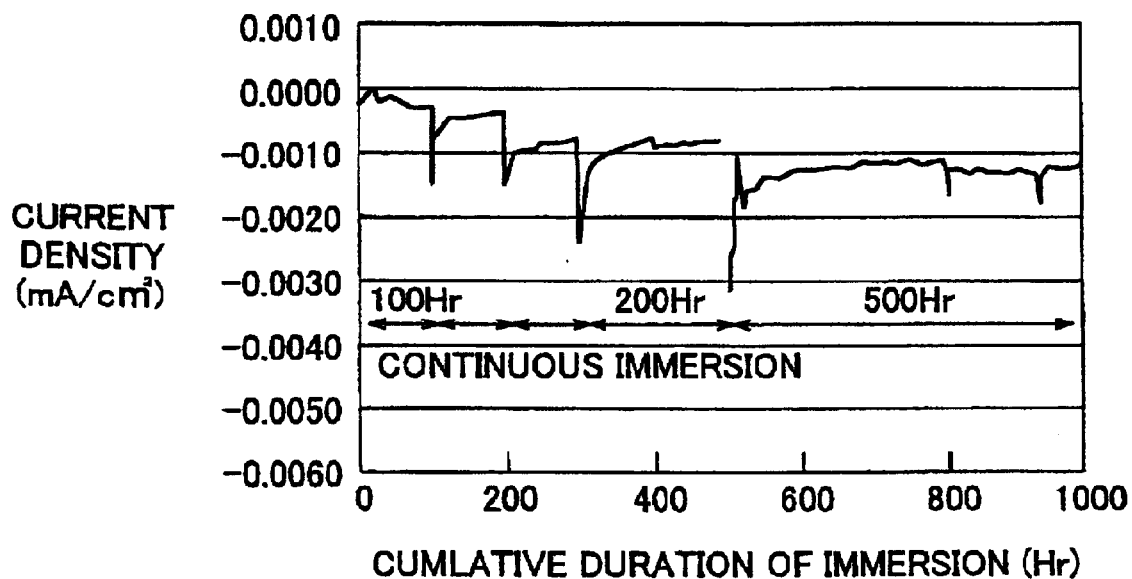
FIG. 15 is an illustration showing the evaluation result regarding the durability of the separator using the corrosion current.
Figure 16:
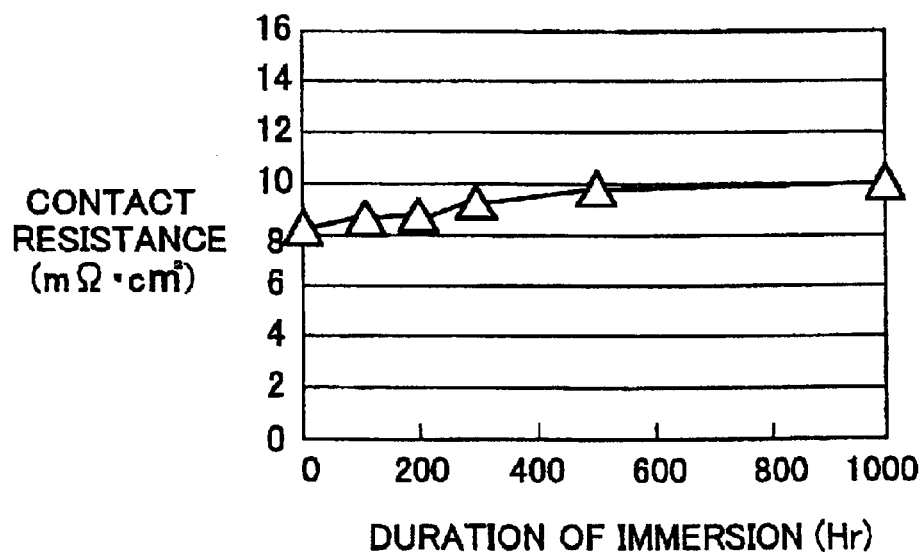
FIG. 16 is an illustration showing the evaluation result regarding the durability of the separator using the contact resistance.

(4-4) Evaluation of Durability:

FIGS. 15 and 16 show the results obtained by examining the durability of a separator for a long time. Here, a separator (separator E) comprising the substrate portion 60 formed from stainless steel, a silver noble metal coating layer 64 with a thickness of 0.01 μm which is formed directly onto the substrate portion 60 by spattering (spattering method 9), and a carbon layer 66 similar to the example described above was used. FIG. 15 shows the result obtained by measuring the corrosion current (the current density detected when the graphite electrode was used as an opposing electrode), as shown in FIG. 12, in a state where the separator E was immersed in sulfuric acid of pH 2 at 80° C. The corrosion current was measured until 1000 hours elapsed after immersion in sulfuric acid. Also, FIG. 16 shows the result where, when the separator was immersed while measuring the corrosion current, as shown in FIG. 15, the contact resistances of the separator were measured at times when 100 hours elapsed, 200 hours elapsed, 300 hours elapsed, 500 hours elapsed, and 1,000 hours elapsed after the start of immersion.

As shown in FIG. 15, the corrosion current became negative values during 1,000 hours after the separator was immersed in sulfuric acid, and the separator E developed an excellent corrosion resistance under these conditions. Also, as shown in FIG. 16, the contact resistance increased from 8 mΩcm$^2$ to 10 mΩcm$^2$ by immersing the separator E in sulfuric acid for 1,000 hours, but this value was sufficiently allowed as the performance of the separator. In this manner, the separator E comprising the noble metal coating layer 64 formed from silver and the substrate portion 60 formed from stainless steel developed a high durability. It is to be noted that, when the durability was examined using a separator with the noble metal coating layer 64 of the separator E formed from gold instead of silver, the corrosion current became negative values like the above, and the contact current only increased from 7.5 mΩcm$^2$ to 8.5 mΩcm$^2$ so that the separator developed a higher durability (not shown).

Figure 17:
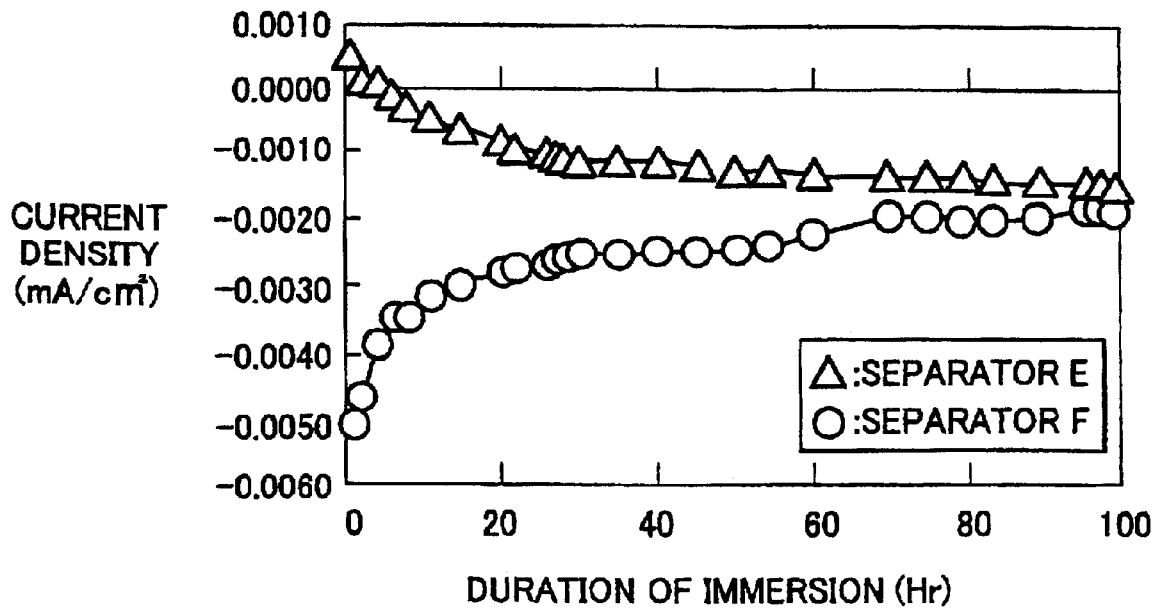
FIG. 17 is an illustration showing the evaluation result regarding the heat resistance of the separator using the corrosion current.
Figure 18:
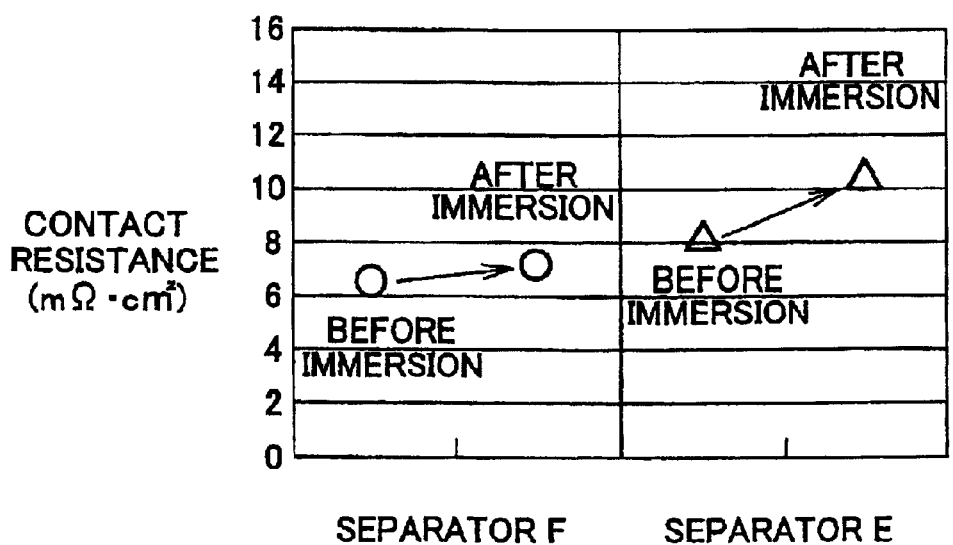
FIG. 18 is an illustration showing the evaluation result regarding the heat resistance of the separator using the contact resistance.

(4-5) Evaluation of Durability:

FIGS. 17 and 18 show the examination results regarding the corrosion resistance of separators under higher temperature conditions. Here, the above separator E and a separator (separator F) with the noble metal coating layer 64 formed from gold instead of silver of the separator E were used. That is, the separator F comprised the substrate portion 60 formed from stainless steel, the noble metal coating layer 64 of gold with a thickness of 0.01 μm which was formed directly onto the substrate portion 60 by a spattering method, and the carbon coating layer 66. FIG. 17 shows the results obtained by immersing the separators E and F in sulfuric acid of pH 2 at 90° C. and measuring the corrosion currents (the current densities detected when the graphite was used as an opposing electrode). The corrosion currents were measured until 100 hours elapsed after immersion in sulfuric acid. FIG. 18 shows the result obtained by measuring the contact currents before the separators E and F were immersed in sulfuric acid and after they were immersed for 100 hours.

As shown in FIG. 17, when the separator E provided with the noble metal coating layer 64 formed from silver was immersed in sulfuric acid at 90° C., the corrosion current was changed from a slight plus to a minus. On the contrary, when the separator F provided with the noble metal coating layer 64 formed from gold was used, the corrosion current was a stable negative value. Also, in both the separators E and F, the values of the contact resistances were sufficiently allowed as the performance required for a separator.

In FIG. 17, it is estimated that the reason why, when the separator E was used, the corrosion current developed a plus value for a while after immersion in sulfuric acid is because a fine amount of silver is oxidized partially at a time of immersion in sulfuric acid of pH 2 at 90° C. For example, it is considered that a relatively low barrier property portion is formed on a surface of the carbon coating layer 66 in the separator E due to operation or treatment at a time of manufacturing the separator. It is considered that, since protection of the noble metal coating layer 64 conducted by the carbon coating layer 66 on such a relatively low barrier property portion is poorer than that on the other portion, such a portion is considered to be corroded more easily. Accordingly, it is considered that the corrosion current observed after immersion occurs due to oxidation of a slight amount of silver (AgO formation or AgO$_2$ formation) on the portion where the protection of the noble metal coating layer 64 conducted by the carbon coating layer 66 is poor. That is, oxidation proceeding of silver can sufficiently be suppressed even on a corrosion region under the environment where silver which is a noble metal is covered with the carbon coating layer 66 to be protected. However, it is considered that the oxidation rate of silver is accelerated under a high temperature of 90° C. so that corrosion current according to the oxidization reaction is observed on a portion where a protection effected by the carbon coating layer 66 is relatively poor.

The corrosion current becomes a negative value in due course and stable. For this reason, it is considered that, when silver is oxidized on the portion where the protection conducted by the carbon coating layer 66 is weak, proceeding of the subsequent corrosion oxidation is stopped. That is, it is considered that, when the separator E provided with the noble metal coating layer 64 formed from silver is immersed in sulfuric acid at 90° C., oxidation of silver proceeds slowly for a while, but the silver develops a stable corrosion resistance thereafter. Therefore, it is considered that, after the portion of silver where the barrier property due to the carbon coating layer is relatively poor is oxidized, a sufficient corrosion resistance can be obtained by silver oxide formed due to reaction with the carbon coating layer 66.

In this manner, the fact that the separator develops an excellent heat resistance (corrosion resistance under a high temperature) indicates that, even when operation temperature of a fuel cell using these separators is set to be high, a sufficient corrosion resistance can be secured.

As shown in FIG. 18, the separator E is larger than the separator F in increase in contact resistance due to immersion in sulfuric acid of pH 2 at 90° C. One of the reasons is estimated to be because silver with an excellent conductivity is substituted with an oxide layer with a poor conductivity on a portion where silver is oxidized.

Also, the performance deterioration of the carbon coating layer 66 could not be recognized under such a severe condition as in sulfuric acid of pH 2 at 90° C.

Figure 19:
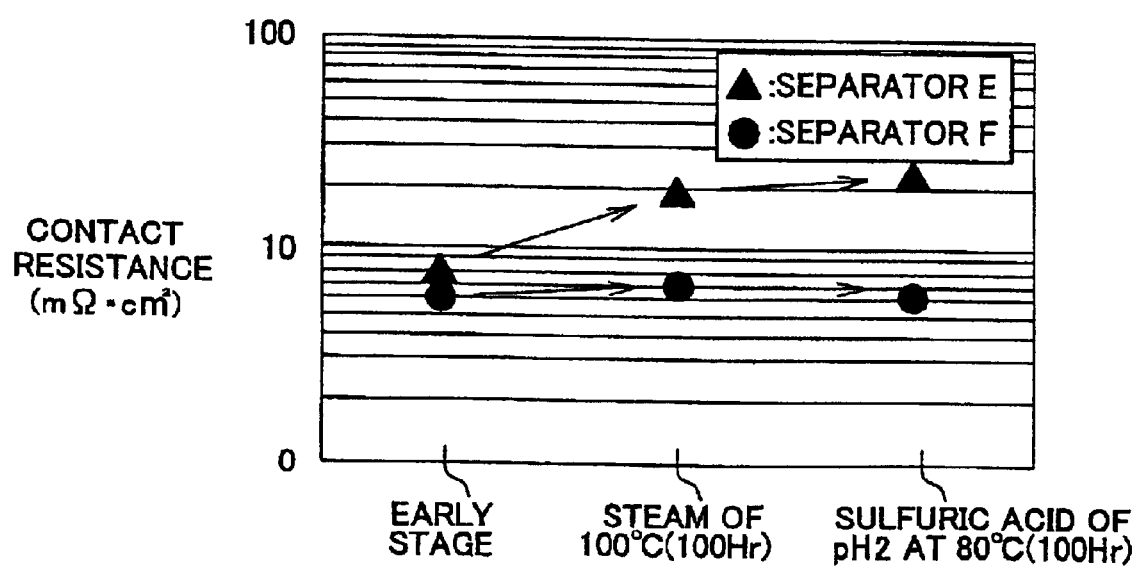
FIG. 19 is an illustration showing the examination result regarding the corrosion property of the separator which has been treated with high temperature steam.
Figure 20:
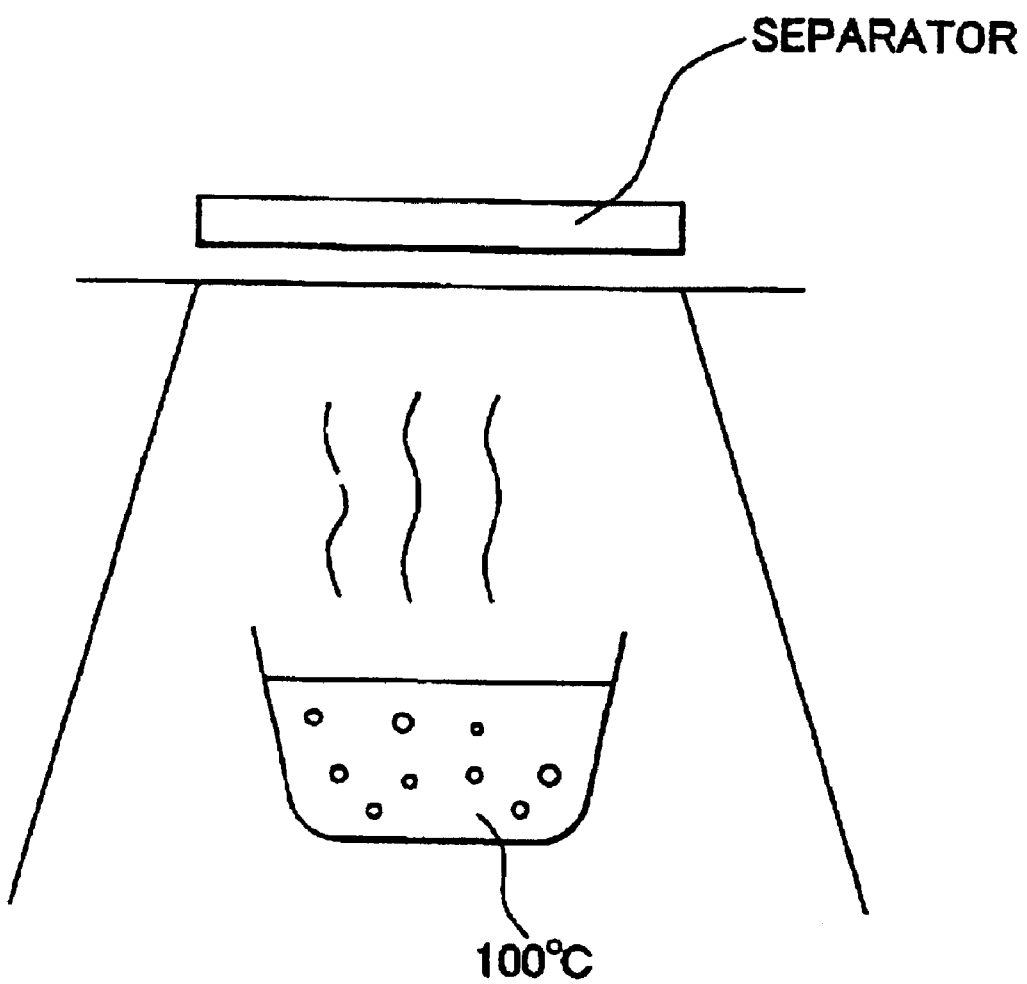
FIG. 20 is an illustration showing an aspect where a separator is treated with a high temperature steam.

(4-6) Evaluation of Influence of Steam on Corrosion Resistance:

FIG. 19 shows the result obtained by measuring the contact resistances of the separators E and F after they were exposed to steam of 100° C. for 100 hours and the result obtained by measuring the contact resistances the separators E and F after they were immersed in sulfuric acid of pH 2 at 80° C. for 100 hours. An aspect performing a processing where each separator is exposed to steam of 100° C. is schematically shown in FIG. 20. The processing for exposure to steam was preformed by boiling (100° C.) water in a water vessel in a constant temperature chamber and arranging a separator placed on a wire net above the water vessel.

Formation water is produced on the cathode side of the fuel cell inside the fuel cell according to electrochemical reaction. Also, wet fuel gas is ordinarily supplied to the anode side. Thus, the interior of the fuel cell is put in a condition where it is much easy to oxidize such that the steam pressure is high. As described above, the processing of exposure to the steam of 100° C. for 100 hours is considered to be a severer processing (exposure to an environment where an oxidization is easy to occur) as compared with such a steam state of the interior of the fuel cell. The evaluation of the reliability required for a gas separator for a fuel cell over a long term was performed by examining the performance under such a severe condition.

As shown in FIG. 19, even after exposure to a high temperature steam, and subsequently even after immersion in sulfuric acid, the contact resistance of the separator F provided with the noble metal coating layer 64 formed from gold developed a stable low value. On the contrary, the increase of the contact resistance of the separator E provided with the noble metal coating layer 64 formed from silver became larger than that of the separator F by exposing the separator E to high temperature steam.

Here, the increase of the contact resistance in the separator E is assumed to be because there is a case that slight oxidation proceeds even in silver which is the noble metal under an oxidation condition severer than that in an ordinary internal environment of a fuel cell and an oxide with a poor conductivity is produced. On the contrary, the separator F provided with the noble metal coating layer 64 formed from gold developed a high corrosion resistance (oxidation resistance) stably even under any conditions mentioned above. It is considered that, even when the operation temperature of the fuel cell is set to be higher, or even when the fuel cell is used for a longer term, an extremely high corrosion resistance is maintained and the performance of the fuel cell can be prevented from deteriorating.

(5) Metal Species Applicable to Separator 30

As has been described above, in the separator 30, the type and thickness of the noble metal forming the noble metal coating layer 64 is selected as appropriate. In addition, various metal combinations are selected as the base metals respectively forming the underlying coating layer 62 and substrate portion 60 in view of the properties of the metals shown in the corrosion diagrams of FIGS. 7A to 7J, FIGS. 8A to 8L, FIGS. 9A to 9L and FIGS. 10A to 10I. Thus, a separator having excellent corrosion resistance and conductivity can be realized. Hereinafter, the structure will be described in which various metals are applied to form the separator 30 based on the properties of the aforementioned metals.

In the separator 30 of this embodiment, excellent corrosion resistance and conductivity are realized by coating the noble metal coating layer 64 of a noble metal with the carbon coating layer 66 containing the carbon materials. Basically, the problem caused by the conductivity (passivation) can be sufficiently prevented by the noble metal coating layer 64 formed from a noble metal (even a noble metal being in the passive state region does not disadvantageously form a passive state film in the environment where the noble metal is protected by the carbon coating layer). Moreover, regarding the noble metal forming the noble metal coating layer 64, the progress in corrosion can be sufficiently suppressed (as described above, even silver being in the corrosion region can sufficiently be suppressed from being corroded by the carbon coating layer 66). Regarding the base metals forming the layers under the noble metal coating layer 64, sufficient corrosion resistance can be realized by selecting them based on the properties shown in the corrosion diagrams. Note that, in the case where silver that is a less expensive noble metal is selected as the noble metal forming the noble metal coating layer 64, the overall cost of the separator can be reduced even if the noble metal coating layer 64 is formed with a larger thickness.

Regarding the metals forming the layers under the noble metal coating layer 64, for example, by selecting a higher-grade (nobler) base metal as the base metal forming the underlying coating layer 62, sufficient overall corrosion resistance of the separator can be realized even if the thickness of the noble metal coating layer 64 coating the underlying coating layer 62 is reduced. Moreover, with the thickness of the noble metal coating layer 64 being the same, corrosion resistance can be improved. For example, in FIG. 11, separators A and B have the same noble metal coating layer 64. However, separator B using a nobler base metal (copper) as the metal forming the underlying coating layer 62 has a lower contact resistance and corrosion current. The noble metal material significantly contributes to the material cost of the separator 30. Therefore, reduction in thickness of the noble metal layer as well as use of a nobler base metal for the underlying coating layer 62 effectively enable the cost reduction. Note that, in the case where different metal species are present, a less noble metal may be more likely to corrode as they have larger ionization tendencies. However, it is desirable to select a nobler base metal such as copper as the underlying coating layer 62. This is because the difference in ionization tendency between the nobler base metal and the noble metal forming the noble metal coating layer 64 is reduced, whereby corrosion of the underlying coating layer 62 is more effectively suppressed. It should be appreciated that, even if a less noble metal is selected as the metal forming the underlying coating layer 62, corrosion resistance of the separator can be ensured by forming the noble metal coating layer 64 with a larger thickness and thus reducing the number of micro plating-defects in the noble metal coating layer 64.

In the foregoing description regarding the base metal forming the underlying coating layer 62, the ionization tendency thereof, i.e., corrosion tendency, was explained. However, corrosion resistance of the separator can also be improved by using a metal in the passive state region as the base metal forming the underlying coating layer 62. For example, as described above, tin is in the passive state region within the fuel cell region. Therefore, no metal ions are eluted by corrosion. Moreover, the passive state layer at the tin surface that causes an increased contact resistance is removed before a noble metal is plated onto the tin surface as the noble metal coating layer. The noble metal coating layer 64 thus formed protects the tin surface, so that a passive state layer is no longer formed. Accordingly, by forming the underlying coating layer 62 from the base metal in the passive state region like tin, a separator having excellent corrosion resistance can be obtained. In this case, since the underlying coating layer 62 has sufficient corrosion resistance, the thickness of the noble metal coating layer 64 formed from a noble metal can be reduced. Note that the underlying coating layer 62 need only have such a thickness that is capable of sufficiently preventing corrosion of the substrate portion 60 coated therewith.

Note that, in the foregoing description, the separator has the underlying coating layer 62. However, the separator need not have the underlying coating layer 62 if the following conditions are satisfied: the noble metal plating can be applied directly onto the substrate portion 60; and the noble metal coating layer 64 of the noble metal plating can be formed with a thickness large enough to reduce the number of micro plating-defects and thus to prevent elution of the substrate portion. Moreover, the metal species forming the respective layers and the respective thickness thereof can be selected as appropriate according to the degree of corrosion resistance required for the separator, and the acceptable cost.

Regarding the metal forming the substrate portion 60, the metal is selected appropriately among the metals having strength enough and being readily formable, in consideration into costs or the like. Stainless steels are used so that the corrosion resistance of the separator increases. Especially, it is preferably to be used austenitic stainless steel.

Note that, in the aforementioned embodiment, the noble metal coating layer 64 and carbon coating layer 66 are formed over the whole separator. However, these layers need not be provided over the whole separator, provided that the required corrosion resistance and conductivity can be ensured. The separator need only have sufficient conductivity in the region that is in contact with an adjacent member when integrated into the fuel cell, so that the metal ions eluted by corrosion can be prevented from penetrating into the solid polymer electrolyte membrane. Accordingly, the only requirement is that the passivation can be prevented from occurring at least in the aforementioned contact region with the adjacent member, and that the corrosion can be prevented from occurring in this contact region and also in the region forming the gas flow paths. Therefore, for example, it is possible to coat the entire separator with the underlying coating layer of tin plating having a sufficient thickness, form the noble metal coating layer 64 of a noble metal only in the contact region with the adjacent member, and coat these regions entirely with the carbon coating layer 66. With such a structure, the region forming the gas flow paths can be sufficiently prevented from corroding, despite the fact that a passive state film is formed at the tin plating surface. In addition, in the contact region with the adjacent member, sufficient conductivity can be maintained by the noble metal layer coating the tin plating. Moreover, like tin, stainless steel having a passive state film formed at its surface has excellent corrosion resistance. Therefore, a separator having excellent corrosion resistance and conductivity can also be obtained by forming the noble metal coating layer 64 of a noble metal in the contact region with the adjacent member within the substrate portion 60 of stainless steel, and forming the carbon coating layer 66 so as to cover the noble metal coating layer 64 and the region forming the flow paths.

As described above, the fuel cell gas separator forms the flow paths of the fuel gas and oxidized gas on both surfaces thereof. In addition to this, the fuel cell gas separator may also form the flow paths of the cooling water for adjusting the operating temperature of the fuel cell on one surface thereof. Such a separator does not necessarily have the same structure as that of the above embodiment on the side forming the cooling water flow paths. In other words, on the side passing the cooling water therethrough, the separator does not have so severe acidic conditions like pH 2 as in the inside of the single cell, but is approximately in the neutral state according to the property of the cooling water. Therefore, on this side, even a base metal in the corrosion region is much less susceptible to corrosion. Moreover, since the separator does not directly communicate with the solid polymer electrolyte membrane on this side, the eluted metal ions do not immediately affect the performance of the fuel cell. Accordingly, all that is required on this side is that the separator can maintain sufficient conductivity and is durable enough to serve as a constituent member of the fuel cell. Therefore, for example, only the underlying coating layer 62, or the underlying coating layer 62 and noble metal coating layer 64 may be formed on this side.

Figure 21:
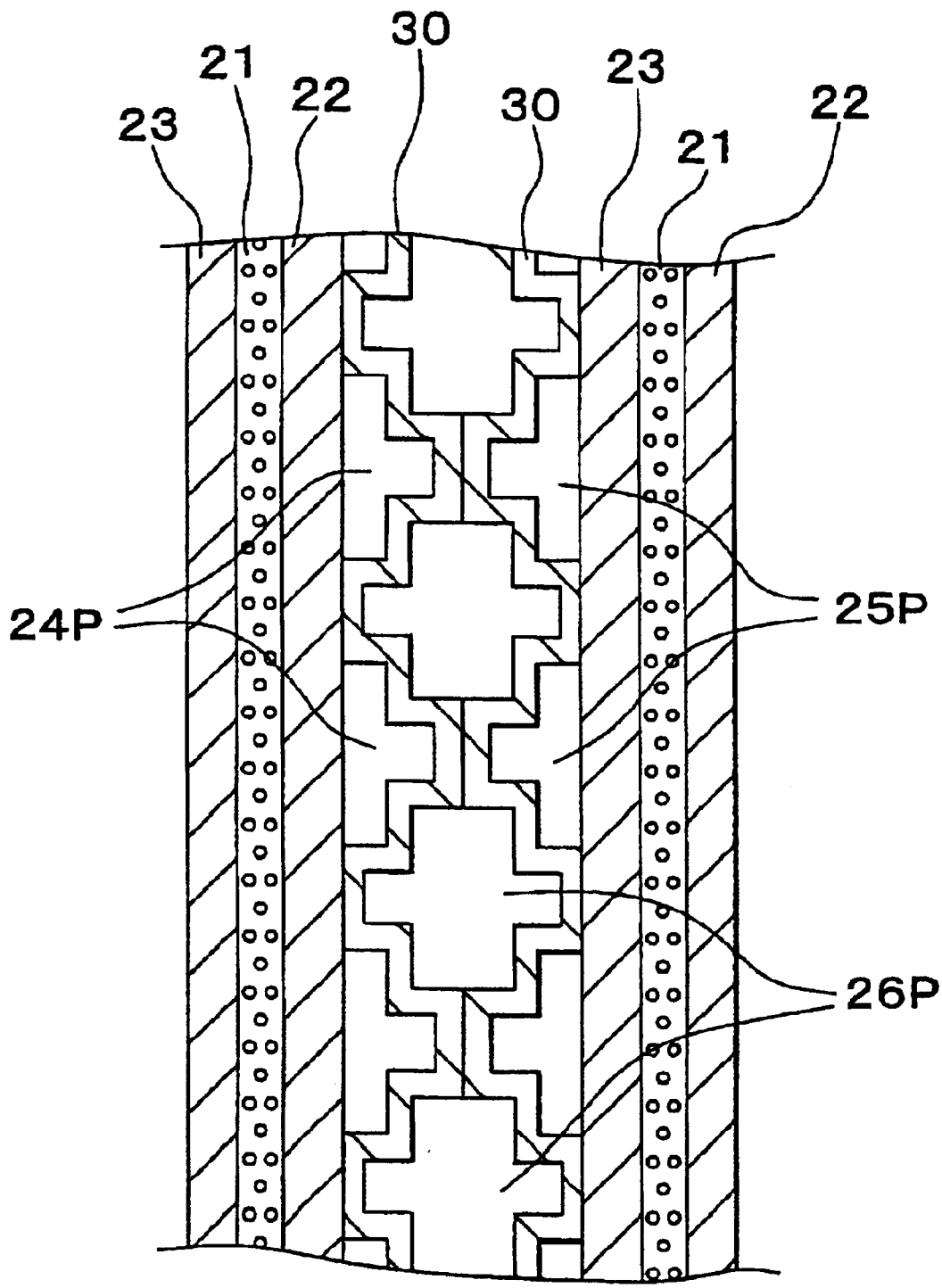
FIG. 21 is an illustration showing the state where the separator forms cooling water flow paths within the fuel cell.

FIG. 21 illustrates the state where the aforementioned separator 30 forms the cooling water flow paths in the fuel cell. In the fuel cell shown in FIG. 21, two separators 30 are laminated each other to form the cooling water flow paths 26P. The cooling water flow paths 26P are formed between adjacent predetermined single cells. Each of the two separators forming the cooling water flow paths 26P forms the fuel gas flow paths 24P or oxide gas flow paths 25P at its one surface together with the adjacent anode 22 or cathode 23 of the single cell, and forms the cooling water paths 26P at the other surface together with the other separator 30. As described above, each separator 30 may be provided only with the underlying coating layer 62 or with the underlying coating layer 62 and noble metal coating layer 64 on the surface forming the cooling water flow paths 26P. Note that, in the separators 30 shown in FIG. 21, the most projecting portion of the surface forming the cooling water flow paths 26P, i.e., the surface in contact with the adjacent separator 30, must ensure an electron flow therethrough during power-generating operation of the fuel cell. Therefore, the respective contact portions of the separators 30 are made to closely adhere to each other without any sealing member that inhibits electron conductivity interposed therebetween. Note that a predetermined sealing member is provided between the respective outer frame regions of the adjacent separators 30 in order to prevent the cooling water from leaking to the outside from the cooling water flow paths 26P. Moreover, in order to prevent electric loss resulting from the electric leakage to the cooling water flowing through the cooling water flow paths 26P, it is desirable to use a liquid having a low dissolved ion concentration as the cooling water flowing through the cooling water flow paths 26P.

(6) Structure, Functions and Effects of Separator 130 of Another Embodiment

In the aforementioned separator, the noble metal coating layer 64 of a noble metal is formed on the underlying coating layer 62 of a base metal in order to prevent passivation from occurring at the surface of the underlying coating layer 62 and thus to ensure the conductivity of the separator. However, the conductivity can also be ensured by the structure other than that having the noble metal layer. Hereinafter, the structure of a separator 130 will be described as another embodiment. The separator 130 has the same structure as that of the aforementioned separator 30, but has a base metal coating layer 164 formed from a base metal having conductive (electron-conductive) particles dispersed therein, instead of the noble metal coating layer 64 formed from a noble metal.

Figure 22:
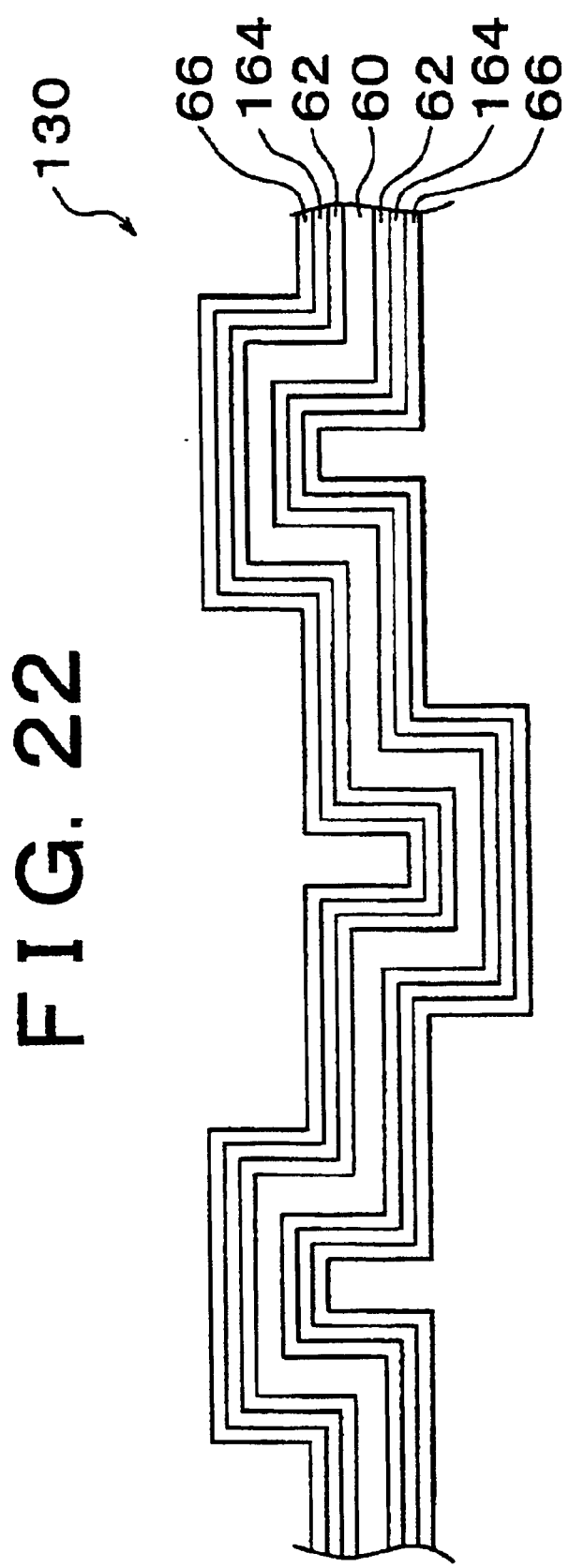
FIG. 22 is an illustration showing the structure of a separator.
Figure 23:
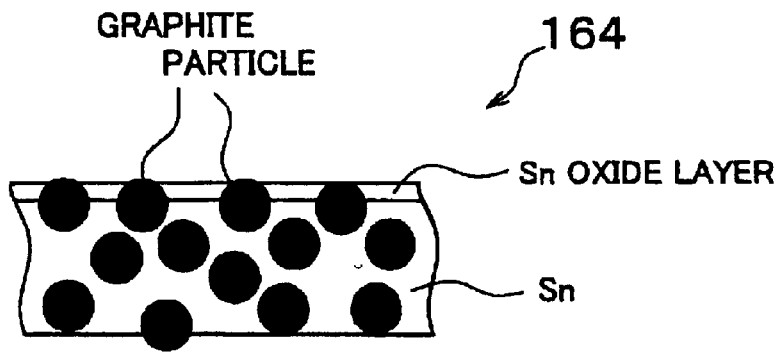
FIG. 23 is an illustration showing the structure of a base metal coating layer 164 provided in the separator.

FIG. 22 is an illustration showing the structure of the separator 130 of the aforementioned another embodiment. The separator 130 has the same structure as that of the separator 30 of the embodiment shown in FIG. 1B, and forms the same fuel cell. However, the separator 130 has the base metal coating layer 164 instead of the noble metal coating layer 64. The structure of the base metal coating layer 164 is shown in FIG. 23. The base metal coating layer 164 is formed from a base metal (tin) with the conductive (electron-conductive) particles (graphite particles) being dispersed therein. The graphite particles included in the base metal coating layer 164 are dispersed in a sufficient amount from the surface of the base metal coating layer 164 (the surface that is in contact with the carbon coating layer 66) across the inside thereof. As shown in FIG. 9E, tin has a large passive state region within the water stabilizing region including the fuel cell region. Therefore, a passive state layer of tin oxide is formed at the surface of the base metal coating layer 164. However, this passive state layer also has a sufficient amount of graphite particles dispersed therein. Note that, regarding the portions other than the base metal coating layer 164, i.e., the substrate portion 60, underlying coating layer 62 and carbon coating layer 66, the separator 130 has the same structure as that of the separator 30.

In manufacturing such a separator 130, Step S120 of forming the noble metal coating layer 64 in the manufacturing process of the separator 30 shown in FIG. 5 need only be replaced with the step of forming the base metal coating layer 164. For example, the base metal coating layer 164 may be formed by the following method: the substrate portion 60 having the underlying coating layer 62 formed thereon is subjected to a plating process with a predetermined amount of graphite particles mixed in the plating bath, so that a tin plating layer having the graphite particles dispersed therein is formed as the base metal coating layer 164. The base metal coating layer 164 may alternatively be formed by spraying the mixture of a predetermined amount of graphite particles and melted tin.

According to the separator 130 of the aforementioned another embodiment structured as such, a separator having excellent conductivity and corrosion resistance can be obtained. Moreover, a noble metal need not be used in the separator. By forming the same fuel cell as that of the above embodiment with the separator 130, degradation in performance of the fuel cell resulting from corrosion and oxidation of the separator can be suppressed, whereby the durability of the fuel cell can be improved.

More specifically, the base metal coating layer 164 of the separator 130 is formed from a base metal, tin. Therefore, even if the base metal coating layer 164 is further coated with the carbon coating layer 66, the surface thereof is oxidized into a passive state layer. However, the overall conductivity of the separator 130 can be ensured by the graphite particles included in the base metal coating layer 164. Tin, which forms the base metal coating layer 164, has a semi-conductive property of predetermined conductivity when oxidized. However, this conductivity is not enough to satisfy the required degree of conductivity for the separator. Moreover, the base metal coating layer covered with the passive state layer of tin would increase the resistance of the separator to an unacceptable degree. In this embodiment, even if such a passive layer is formed in the region where the base metal coating layer 164 is in contact with the carbon coating layer 66, the conductivity in this contact region is ensured by the graphite particles in the passive state layer. As a result, sufficient overall conductivity of the separator 130 can also be retained.

As described above, since tin is in the passive state region, the energy state thereof is not stabilized by corrosion. Moreover, the passive state layer resulting from oxidation of the tin surface protects the inside of the tin layer. Therefore, the separator 130 of this embodiment having the tin-containing base metal coating layer 164 coated with the carbon coating layer 66 have sufficient corrosion resistance.

Note that, in the aforementioned another embodiment, the base metal coating layer 164 is formed from tin. However, the base metal coating layer 164 may be formed from another metal. For example, the base metal coating layer 164 may be formed from a tin alloy such as tin-bismuth alloy or tin-indium alloy, nickel, copper, or the like. The same effects can be obtained as long as the base metal coating layer 164 of this embodiment is formed from a metal having a passive state region in the fuel cell region and providing sufficient corrosion resistant by means of a passive state layer formed at its surface. Moreover, the base metal coating layer 164 includes the graphite particles in this embodiment. However, instead of such a particulate carbon material, another type of conductive particles may be included in order to ensure the conductivity. For example, noble metal particles or conductive ceramic particles may be used instead of the graphite particles. Moreover, like the separator 30 of the aforementioned embodiment, various materials can be selected as the respective materials forming the carbon coating layer 66, underlying coating layer 62 and substrate portion 60 in the separator 130 of this embodiment.

As described above, in the base metal coating layer 164 of the aforementioned another embodiment, the passive state layer realizes the corrosion resistance, and the graphite particles included in the passive state layer ensure the conductivity. Thus, in the aforementioned another embodiment, the graphite particles are dispersed entirely across the base metal coating layer 164. However, all that is required is that the graphite particles can ensure the conductivity at least in the passive state layer formed at the surface of the base metal coating layer 164. When the surface of the passive state layer formed over the base metal coating layer 164 and the inside of the base metal coating layer 164 covered with the passive state layer are held in a good conductive state by a sufficient amount of graphite particles, the overall resistance of the separator can be suppressed. The amount of graphite particles included in the base metal coating layer 164 need only be determined as appropriate according to the degree of conductivity required for the separator 130 and easiness of formation of the base metal coating layer 164 including the graphite particles.

Moreover, in the aforementioned another embodiment, the underlying coating layer 62 is provided between the base metal coating layer 164 and substrate portion 60. However, provided that the passivation rate of the substrate portion 60 is low enough, or the passivation of the substrate portion 60 need not be considered, the base metal coating layer 164 may be provided directly onto the substrate portion 60. In this case, in order to prevent the progress in corrosion of the substrate portion 60 through the base metal coating layer 164, it is desirable to form the base metal coating layer 164 with a sufficient thickness (e.g., 10 μm or more). Moreover, in the aforementioned another embodiment, the carbon coating layer 66, base metal coating layer 164 and underlying coating layer 62 are formed over the whole surface of the separator so as to ensure the conductivity and corrosion resistance. However, such a laminated structure of the layers may alternatively be provided only in the region corresponding to the surface associated with the contact resistance out of the contact surface of the separator that is in contact with an adjacent member (gas diffusion electrode) within the fuel cell. Such a structure can also realize desired overall corrosion resistance and conductivity of the separator as long as sufficient corrosion resistance in the other regions can be ensured by different methods.

Note that, in the above embodiments, the separators 30 and 130 have such a shape as shown in FIGS. 1, 2, 3, 22 and the like. However, the shape of the separator is not limited to this, and the structure of the separator of the invention can be applied to the separators having different shapes. By applying the invention to a separator that forms a flow path (for a fluid provided for the electrochemical reaction) within a single cell, the same effects as those of the above embodiments can be obtained.

Although a polymer electrolyte fuel cell is exemplified in the above embodiments, the fuel cell gas separator of the invention can also be used in the different types of fuel cells. The fuel cells include those operating at a higher temperature than that of the polymer electrolyte fuel cell, those having a strongly acidic or alkaline electrolyte layer, those providing the hydrocarbon-based fuel such as alcohol directly for the electrochemical reaction, and the like. In the separators to which the invention is applied, the respective materials forming the aforementioned noble metal coating layer, carbon coating layer, underlying coating layer and base metal coating layer need only be selected so as to satisfy the property requirements of each fuel cell such as heat resistance, acid resistance, alkali resistance and chemical resistance (resistance to a substance supplied as the fuel).

(7) Another Separator Manufacturing Method

In the aforementioned embodiments, the separator 30 or 130 was manufactured by first forming the substrate portion 60 into a predetermined shape and then forming the noble metal coating layer 64 (or base meal coating layer 164) and carbon coating layer (and also the underlying coating layer if the separator having the underlying coating layer is to be manufactured). However, the step of forming the noble metal coating layer and carbon coating layer may be conducted before formation of the substrate portion 60. Hereinafter, such a structure will be described as a further embodiment. In this embodiment is described the process of manufacturing a plurality of separators by using a single sheet metal as a metal member serving as a base material of the separators.

Figure 24:
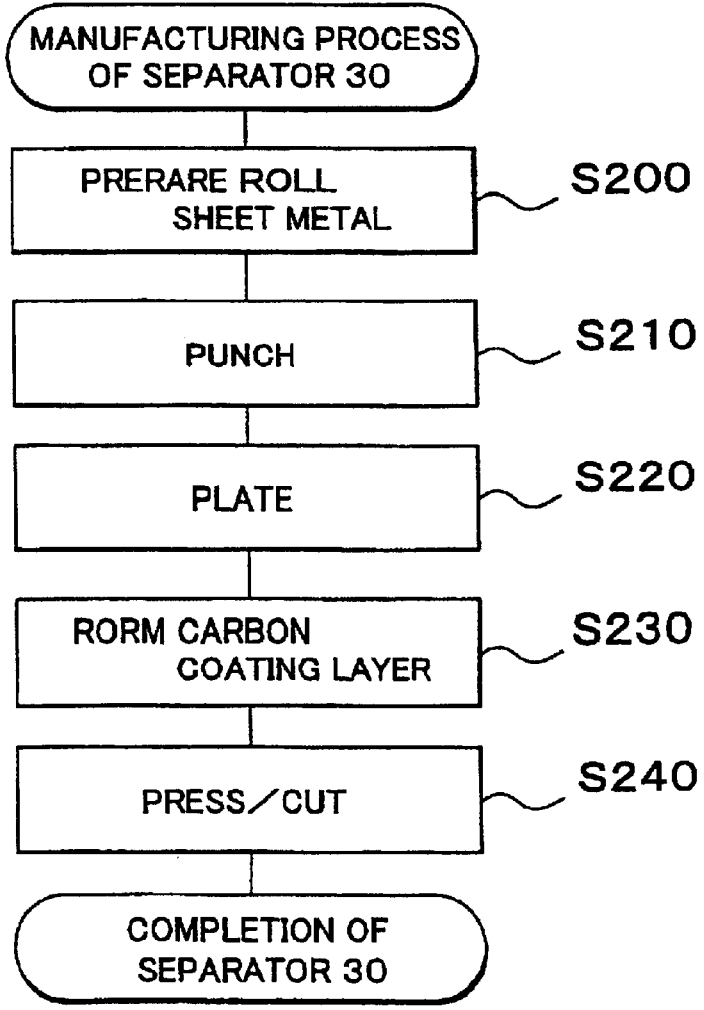
FIG. 24 is a flowchart illustrating a manufacturing method of a separator according to another embodiment.

FIG. 24 is a flowchart illustrating a method for manufacturing a separator according to the aforementioned further embodiment. FIGS. 25 to 28 are illustrations showing the steps of the manufacturing method shown in FIG. 24. Note that, herein, the process of manufacturing the same separator as that of the embodiment shown in FIG. 1B, i.e., the separator 30 having the underlying coating layer 62, noble metal coating layer 64 and carbon coating layer 66 is described. In the method for manufacturing the separator 30 of this embodiment, a roll sheet metal 70 is first prepared (Step S200). The roll sheet metal 70 forms the substrate portion 60 of the separator 30. A stainless steel roll sheet was herein prepared. As described above, the manufacturing process of the separator of this embodiment produces a plurality of separators from a single sheet metal. This roll sheet has a width corresponding to one side of the separator 30 to be manufactured, and also has a length enough to allow a desired number of separators to be manufactured.

Then, the roll sheet metal 70 is punched such that the holes with a predetermined shape are formed therein (Step S210). The holes formed in this step form the fluid flow paths within the assembled fuel cell having the members including the separator 30 stacked on each other. In the separator shown in FIG. 3, these holes correspond to the fuel gas holes 50, 51 and oxidized gas holes 52, 53. It should be appreciated that, in this punching process, the holes for forming the cooling water flow paths extending though the fuel cell stack in the stacking direction may also be formed simultaneously with the holes for forming the fuel gas and oxidized gas flow paths. Step S210 is conducted as the step for forming the hole structures in the separator 30.

Figure 25A:
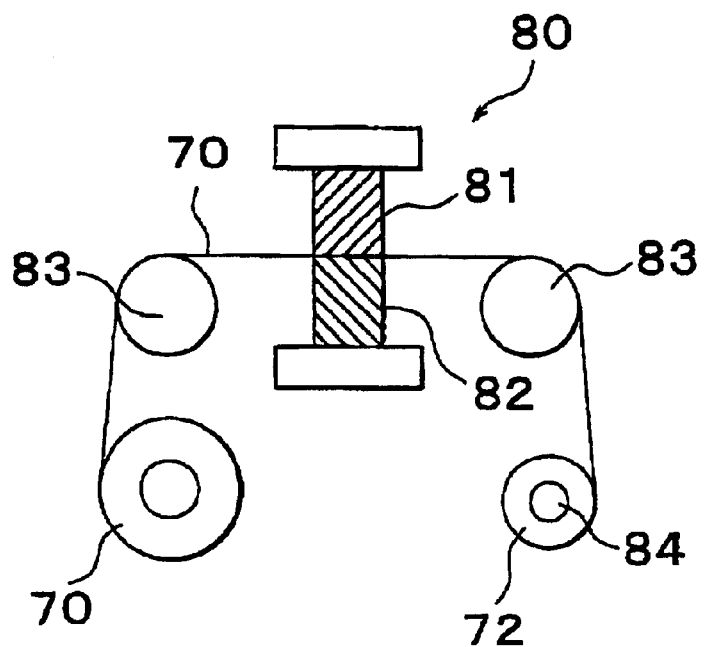
FIGS. 25A and 25B are illustrations showing the punching step.
Figure 25B:
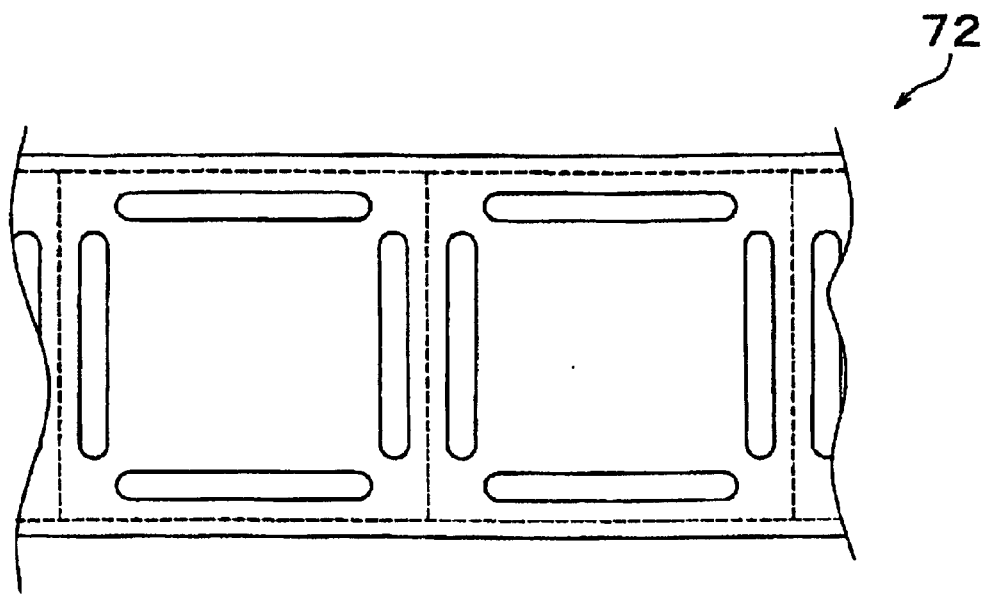

FIG. 25A shows the punching process of Step S210. In this embodiment, when the roll sheet metal 70 is subjected to a predetermined process like the punching process and other processes described below, the roll sheet metal 70 is sequentially fed from its end by rollers into a predetermined apparatus for punching or the like, while the processed portion is sequentially rolled up by a take-up roller. In Step S210, the roll sheet metal 70 is guided with the rollers (shown as intermediate rollers 83 in FIG. 25A) into a punch press apparatus 80 having upper and lower dies 81, 82, where the roll sheet metal 70 is punched. The resultant sheet metal 72 having the predetermined holes is rolled up by the take-up roller 84. Thus, the plurality of holes in the resultant sheet metal 72 are formed such that the desired holes are located at desired positions in each separator when the sheet metal is divided into a plurality of separators 30 in Step S240 described below. FIG. 25B is an illustration showing the roll (in the figure, strip-shaped) sheet metal 72 having such holes formed therein. In FIG. 25B, the positions where the sheet metal is finally divided into individual separators are shown by the dashed lines, and the same holes as the fuel gas holes 50, 51 and oxidized gas holes 52, 53 of FIG. 3 are shown schematically. However, the holes may be formed at predetermined positions with a predetermined size, according to a desired shape of the separator.

Figure 26:
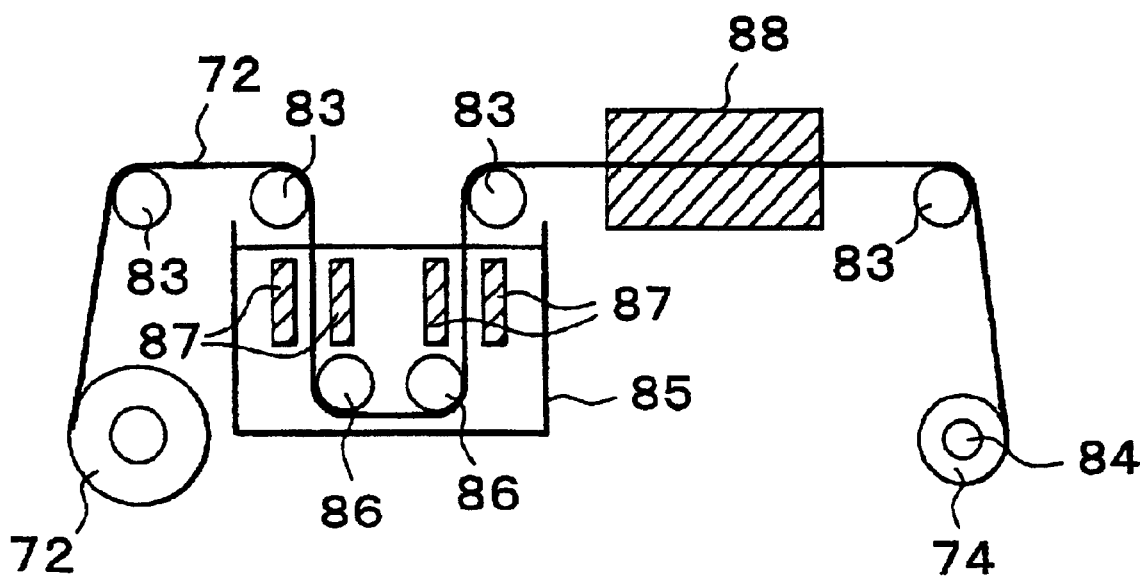
FIG. 26 is an illustration showing the plating step.

The punched sheet metal 72 thus obtained in Step S210 is then subjected to a plating process (Step S220). In Step S220 of this embodiment, a copper plating layer serving as the lower coating layer 62 and a silver plating layer serving as the noble metal coating layer 64 are sequentially formed on the sheet metal 72 in this order. FIG. 26 shows the state where the plating process is conducted. More specifically, FIG. 26 shows the state where electroplating is conduced as the plating process. It should be appreciated that the underlying coating layer 62 and noble metal coating layer 64 may be formed by another method such as electroless plating, vapor deposition and sputtering. In the plating process shown in FIG. 26, the sheet metal 72 is sequentially guided from its end by the rollers (shown as intermediate rollers 83 and in-bath rollers 86 in FIG. 26) into a plating bath 85 containing a predetermined plating solution (initially, a plating solution for copper plating), where the sheet metal 72 is subjected to the plating process. The resultant sheet metal 74 having a plating layer formed thereon is rolled up by the take-up roller 84 through a drier 88.

In the electroplating process, both the sheet metal 72 and an insoluble electrode (electrode 87 in FIG. 26) such as stainless steel are connected to a predetermined power source such that the sheet metal 72 serves as a negative electrode and the insoluble electrode serves as a positive electrode in a plating solution containing a metal material such as copper or silver for forming a plating layer. With application of a DC voltage of several volts, a predetermined metal is deposited on the surface of the sheet metal 72 to form a plating layer. Note that the power supply, the wiring for connecting the electrodes, and the like are not shown in FIG. 26. Moreover, in the plating step shown in FIG. 26, the electrode 87 serving as a positive electrode is provided on both sides of the sheet metal 72, so that the plating layer is formed simultaneously on both surfaces of the sheet metal 72. Note that the sheet metal 74 plated in the plating bath 85 passes through the drier 88. This drier 88 is an apparatus for removing the plating solution adhering to the plated sheet metal 74 by air blow or the like. In Step S220, copper plating is conducted according to the process shown in FIG. 26, and then a silver plating process is similarly conducted. Thus, the sheet metal 76 having the copper and silver plating layers is formed.

Figure 27:
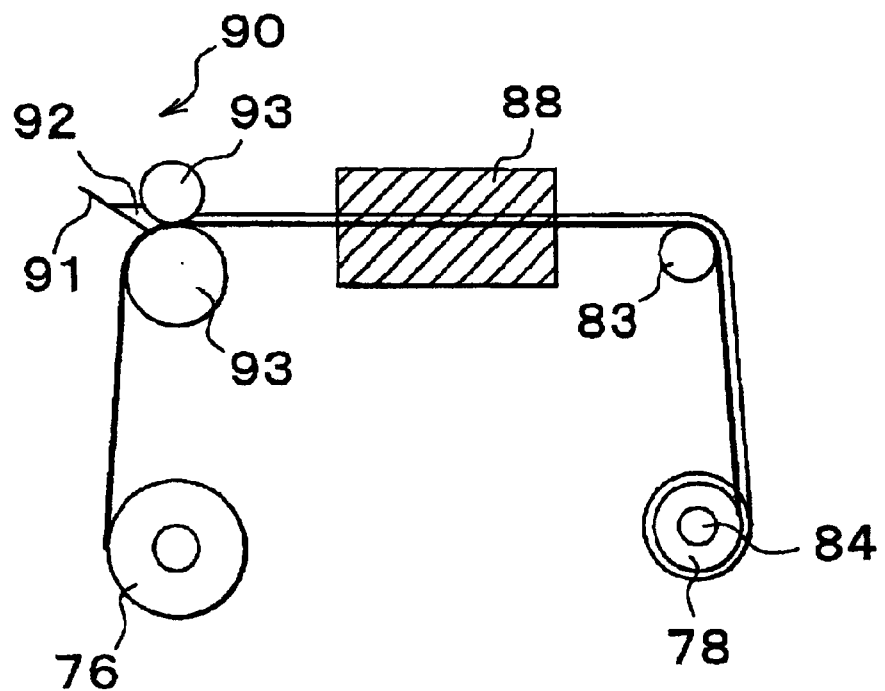
FIG. 27 is an illustration showing the step of forming a carbon coating layer.

After the plating process, a carbon coating layer is formed on the plated sheet metal 76 (Step S230). FIG. 27 shows the state where roll coating is conducted as the step of forming the carbon coating layer. In this process, the sheet metal 76 having the copper and silver plating layers formed thereon is sequentially guided from its end by the rollers into a coating apparatus 90. The sheet metal 76 having graphite paint applied thereto by the coating apparatus 90 passes through the drier 88, and is rolled up by the take-up roller 84 as the sheet metal 78 having the carbon coating layer formed thereon. Herein, the coating apparatus 90 is provided with a doctor blade 91 and coating rollers 93, and feeds the sheet metal 76 between the coating rollers 83 while supplying graphite paint 92 onto the sheet metal 76 using the doctor blade 91. Thus, the graphite paint is applied with a uniform thickness onto the sheet metal 76. The graphite paint 92 is formed from the aforementioned carbon materials and binder mixed with a predetermined solvent (e.g., a solvent such as xylol, triol or isopropyl alcohol, or water) into a paste form. While the sheet metal 76 having the graphite paint 92 applied thereto is passing through the drier 88, the aforementioned solvent contained in the graphite paint 92 is removed, resulting in the sheet metal 78 having the carbon coating layer formed thereon. As described above, the carbon coating layer can also be formed by immersion or spraying. However, by using the coating apparatus 90 as shown in FIG. 27, the carbon coating layer be easily formed with a uniform thickness onto the roll sheet metal.

Note that FIG. 27 shows the step of forming the carbon coating layer on one surface of the sheet metal 76. However, in manufacturing a separator having the carbon coating layer 66 on both surfaces like the separator 30 shown in FIG. 1, the step of FIG. 27 is repeated twice so as to apply the graphite paint 92 to both surfaces of the sheet metal 76. Thus, the sheet metal 78 having the carbon coating layer on both surfaces is formed.

Figure 28:
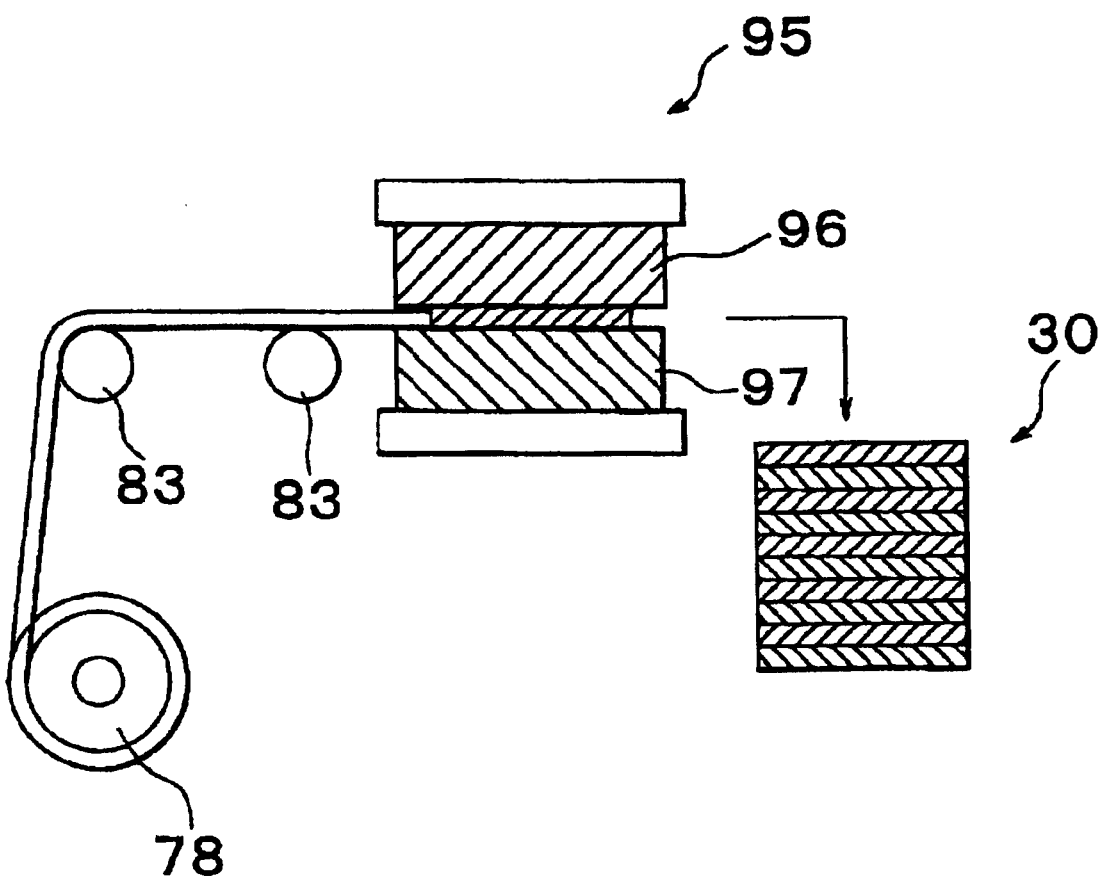
FIG. 28 is an illustration showing the press forming/cutting step.

After the carbon coating layer is formed, the sheet metal 78 is formed into a predetermined concave-convex shape, and the resultant sheet metal is divided into individual separators (Step S240), thereby completing the separators 30. FIG. 28 illustrates the step of forming and separating the sheet metal 78, i.e., the press/cut process. In this process, the sheet metal 78 having the carbon coating layer formed thereon is sequentially guided from its end by the rollers (shown as intermediate rollers 83 in FIG. 28) into a press/cut apparatus 95. The press/cut apparatus 95 is provided with dies 96, 97. By pressing the sheet metal 78 with these dies, the sheet metal 78 is formed into the predetermined convex-concave shape. Moreover, the resultant sheet metal 78 is sequentially cut at predetermined positions into the separators 30 having the predetermined concave-convex shape.

Note that, in the manufacturing method of the separator 30 of this embodiment, as shown in FIG. 28, the predetermined concave-convex shape is formed in Step S240 by the press forming method using the apparatus provided with the dies 96, 97. However, the predetermined concave-convex shape may be formed by a roll forming method using a roller-type die instead of the upper die 96 of FIG. 28. Moreover, in this embodiment, shaping and separation of the sheet metal are simultaneously conducted with the press/cut apparatus 95. However, such shaping and separation may be conducted separately.

According to such a manufacturing method of the separator of this embodiment, the surface treatments such as formation of the metal layer by plating and formation of the carbon coating layer are conducted prior to the step of forming the sheet metal into the concave-convex shape. Therefore, these surface treatments can be conducted to the flat sheet metal, whereby the operation for the surface treatments is facilitated. In the case where separate sheet metals corresponding to individual separators are used and the individual separators are shaped after the surface treatments, the surface treatments are conducted to the flat sheet metals. Therefore, the predetermined effect of facilitating the operation for the surface treatments can be obtained. However, in the case where a roll sheet metal is used like the aforementioned embodiment, the sheet metal is continuously subjected to the surface treatment from its end and finally separated into the individual separators. Therefore, productivity of the separator can further be improved.

Moreover, since formation of the carbon coating layer can be conducted on the flat sheet metal, the method of roll-coating the graphite paint as shown in FIG. 27 can be used to form the carbon coating layer. Thus, the uniformity of the thickness of the carbon coating layer 66 can be improved. Accordingly, in the fuel cell using the separator thus manufactured, the internal resistance resulting from the carbon coating layer can be made more uniform, whereby the power-generation efficiency of the fuel cell can be improved. Moreover, by conducting the pressing process after formation of the carbon coating layer, adhesion between the carbon coating layer and the underlying metal layer is improved. With such improvement in adhesion of the carbon coating layer, the internal resistance of the fuel cell can further be reduced.

Note that, in the aforementioned embodiment, the method for manufacturing the same separator 30 as that of the embodiment shown in FIG. 1A is described. However, such a manufacturing method, i.e., the manufacturing method in which the metal layer and carbon coating layer are formed before forming the predetermined concave-convex shape, can be applied to various separators having a predetermined concave-convex shape and having on a metal substrate portion the layers formed from materials different from that of the substrate portion. In this case as well, the same effects can be obtained. For example, in the aforementioned separator 30, the material forming the sheet metal as the substrate portion 60, the materials forming the underlying coating layer 62 and noble metal coating layer 64, and the like can be selected as appropriate from various materials, as described above. In the case where the separator is not provided with the underlying coating layer 62, the plating process of FIG. 26 is conducted once in Step S220 of FIG. 24 such that the noble metal layer as the first coating layer is formed directly onto the sheet metal.

In the case where the aforementioned manufacturing method is applied to the separator 130 shown in FIG. 22, the base metal coating layer 164 can be formed by the plating process using the graphite-particle mixed plating bath. As described above, the base metal coating layer 164 can also be formed by spraying the mixture of melted tin and graphite particles or by another method. In such a case as well, the base metal coating layer 164 can be efficiently formed by sequentially spraying the mixture from the end of the roll sheet metal as in the aforementioned embodiment.

As described above, in the case where the cooling water flow paths are formed at one surface of the separator, only the underlying coating layer 62, or only the underlying coating layer 62 and noble metal coating layer 64 (or base metal coating layer 164) may be formed on this surface with the carbon coating layer being formed only on the other surface. In such a case, the process of FIG. 27 is conducted only once in Step S230 of FIG. 24 so as to form the carbon coating layer only on one surface of the sheet metal 76.

In the aforementioned embodiments, the predetermined hole structures (such as fuel gas holes 50, 51 and oxidized gas holes 52, 53) are formed in the vicinity of the outer periphery of the sheet metal forming the separator substrate portion 60. When the separators are stacked on each other, these hole structures form the fluid flow paths extending in the stacking direction of the fuel cell. Instead of such a structure, the separator may alternatively be formed from combination of an inner member and an outer frame member. More specifically, the structure for forming the gas flow paths at its surface within a single cell (i.e., the inner member corresponding to the region where the ribs 54, 55 are formed in the separator shown in FIG. 3) is formed from a sheet metal having subjected to the surface treatments as described above. The structure for forming the fluid flow paths extending in the stacking direction (i.e., the outer frame member corresponding to the outer peripheral region in which the fuel gas holes 50, 51 and oxidized gas holes 52, 53 are formed in the separator shown in FIG. 3) is formed from a member that is separate from the aforementioned sheet metal. Thus, the separator may be manufactured from combination of the inner member and outer frame member. In this case as well, in manufacturing the structure for forming the gas flow paths within the single cell (the inner member), the surface treatments such as plating and application may be conducted prior to formation of the concave-convex shape. In addition, a plurality of separators may be formed from a roll sheet metal. As a result, the aforementioned effects can be obtained. Note that, in the case where the inner member is formed from a sheet metal, the punching process in Step S210 need only be omitted from the manufacturing process of FIG. 18.

In the case where the separator is manufactured from combination of the outer frame member and the inner member formed from a sheet metal subjected to a predetermined treatment as described above, the outer frame member may be formed from an insulating material such as resin, rubber and ceramics. Thus, the insulation property in the outer periphery of the fuel cell stack can be ensured by the outer frame member. Note that, in the case where the whole structure including the region having the hole structures for forming the fluid flow paths is formed by using a sheet metal as the substrate portion, the insulation property in the outer periphery of the fuel cell stack may be ensured by providing an insulating sealant on the inner side of the outer periphery of the separator (e.g., on the region where the hole structures are formed).

In the manufacturing method of the aforementioned embodiment, the predetermined concave-convex shape is formed after formation of the metal layers (the underlying coating layer 62 and the noble metal coating layer 64 or base metal coating layer 164) and the carbon coating layer 66. Therefore, the productivity can be more satisfactorily improved. However, the process of forming the concave-convex shape (such as press forming) may be conducted at any stage. Even if the process of forming the concave-convex shape is conducted after formation of the underlying coating layer and noble metal coating layer and then the carbon coating layer is formed, a separator having the same structure as that of the aforementioned separator can be manufactured.

Although the embodiments of the invention have been described, it should be understood that the invention is not limited to such embodiments and can be embodied in various forms without departing from the spirit and scope of the invention.

What is claimed is:

1. A fuel cell gas separator integrated into a fuel cell and forming a gas flow path, comprising:

a separator base material formed from a metal and having a surface;

a noble metal coating layer formed from a noble metal and formed at least on the surface of the separator base material in a region of the gas separator associated with an electrical contact resistance between the gas separator and an adjacent member of the fuel cell when the gas separator is brought into contact with the adjacent member when the gas separator is integrated into the fuel cell; and a carbon coating layer formed on the noble metal coating layer and containing a carbon material.

2. The gas separator according to claim 1, wherein the noble metal coating layer has a thickness in a range from 0.01 $\mu$m to 10 $\mu$m.

3. The gas separator according to claim 1, wherein the noble metal forming the noble metal coating layer is silver.

4. The gas separator according to claim 1, wherein the separator base material is formed from a base metal, the carbon coating layer is formed on a region forming the gas flow path within the fuel cell, in addition to the region where the noble metal coating layer is formed on the surface of the separator base material, and the base metal forming the separator base material forms a passive state film under a condition that the carbon coating layer is formed thereon.

5. The gas separator according to claim 1, wherein the noble metal coating layer is further formed on a region forming the gas flow path, in addition to the region of the gas separator that contacts the adjacent member.

6. The gas separator according to claim 1, further comprising an underlying coating layer formed from a base metal and formed between the noble metal coating layer and the separator base material on the region of the gas separator that contacts the adjacent member.

7. The gas separator according to claim 6, wherein the base metal forming the underlying coating layer is nobler than the metal forming the separator base material.

8. The gas separator according to claim 7, wherein the carbon coating layer and the underlying coating layer are formed on a region forming the gas flow path within the fuel cell, in addition to the region of the gas separator that contacts the adjacent member, and the underlying coating layer is formed from a base metal that forms a passive state film under a condition that the carbon coating layer is formed thereon.

9. The gas separator according to claim 6, wherein the underlying coating layer has a thickness in a range from 0.01 μm to 10 μm.

10. The gas separator according to claim 1, wherein the carbon coating layer includes an acid-resistant resin or rubber as a binder.

11. The gas separator according to claim 1, wherein the noble metal forming the noble metal coating layer is gold.

12. A method for manufacturing a fuel cell gas separator integrated into a fuel cell and forming a gas flow path, comprising the steps of:

forming a separator base material having a predetermined shape from a metal;

forming a noble metal coating layer from a noble metal at least on the separator base material in a region of the gas separator associated with an electrical contact resistance between the gas separator and an adjacent member of the fuel cell when the gas separator is brought into contact with the adjacent member when the gas separator is integrated into the fuel; and forming a carbon coating layer from a carbon material on a surface of the noble metal coating layer.

13. The manufacturing method according to claim 12, wherein the step of forming a noble metal coating layer includes the steps of:

prior to forming the noble metal coating layer, forming an underlying coating layer from a base metal at least on the region associated with the electrical contact resistance on the separator base material; and forming the noble metal coating layer on the underlying coating layer.

14. The manufacturing method according to claim 12, wherein the noble metal forming the noble metal coating layer is silver.

15. A method for manufacturing a fuel cell gas separator integrated into a fuel cell and forming a gas flow path, comprising the steps of:

forming a noble metal coating layer from a noble metal at least on a region of a surface of a metal member serving as a base material of the gas separator;

forming a carbon coating layer from a carbon material on a surface of the noble metal coating layer; and forming the metal member having both the noble metal coating layer and the carbon coating layer being formed on the surface of the metal member into a predetermined shape.

16. The manufacturing method according to claim 15, wherein the step of forming a noble metal coating layer includes the steps of:

prior to forming the noble metal coating layer, forming an underlying coating layer from a base metal at least on the region where the noble metal coating layer is formed on the metal member; and forming the noble metal coating layer on a surface of the underlying coating layer.

17. The manufacturing method according to claim 15, wherein the noble metal forming the noble metal coating layer is silver.

18. The manufacturing method according to claim 15, wherein the metal member is a sheet-like member capable of producing a plurality of fuel cell gas separators, and the step of forming the metal member into a predetermined shape includes the steps of:

providing the metal member with a predetermined concave-convex shape; and then dividing the metal member into a plurality of single elements of the gas separator base material.

19. The manufacturing method according to claim 15, wherein the noble metal forming the noble metal coating layer is gold.

20. A fuel cell using the gas separator according to claim 1.

* * * * *